United States Patent
Chai et al.

(10) Patent No.: US 10,423,037 B2
(45) Date of Patent: Sep. 24, 2019

(54) LIQUID CRYSTAL DISPLAY PANEL AND LIQUID CRYSTAL DISPLAY DEVICE

(71) Applicant: Shanghai Tianma Micro-Electronics Co., Ltd., Shanghai (CN)

(72) Inventors: Huiping Chai, Shanghai (CN); Lingxiao Du, Shanghai (CN); Kang Yang, Shanghai (CN); Hong Ding, Shanghai (CN); Yan Zhuang, Shanghai (CN)

(73) Assignee: SHANGHAI TIANMA MICRO-ELECTRONIC CO., LTD., Shanghai (CN)

(*) Notice: Subject to any disclaimer, the term of this patent is extended or adjusted under 35 U.S.C. 154(b) by 55 days.

(21) Appl. No.: 15/787,267

(22) Filed: Oct. 18, 2017

(65) Prior Publication Data

US 2018/0373102 A1     Dec. 27, 2018

(30) Foreign Application Priority Data

Jun. 21, 2017   (CN) .......................... 2017 1 0473985

(51) Int. Cl.
  *G02F 1/1343*   (2006.01)
  *G02F 1/1362*   (2006.01)
  *G02F 1/1335*   (2006.01)

(52) U.S. Cl.
  CPC .. *G02F 1/134336* (2013.01); *G02F 1/133514* (2013.01); *G02F 1/136286* (2013.01);
  (Continued)

(58) Field of Classification Search
  CPC ......... G02F 1/136286; G02F 1/134336; G02F 1/133514; G02F 2201/52; G02F 2001/134345
  See application file for complete search history.

(56) References Cited

U.S. PATENT DOCUMENTS 8,730,444 B2 * 5/2014 Tsai .................. G02F 1/134309
                                                       349/106
2008/0272987 A1 * 11/2008 Lee ......................... G02F 1/167
                                                       345/55
(Continued)

FOREIGN PATENT DOCUMENTS

CN         103811534 A      5/2014

OTHER PUBLICATIONS

Chinese OA dated Jul. 2, 2019 for corresponding CN Application No. 201710473985.3.

*Primary Examiner* — Hoan C Nguyen
(74) *Attorney, Agent, or Firm* — Tarolli, Sundheim, Covell & Tummino LLP

(57) ABSTRACT

Embodiments of the present disclosure provide a liquid crystal display panel, including: a first substrate; a second substrate; and a liquid crystal layer arranged therebetween; the first substrate includes a plurality of sub-pixels, the sub-pixels are divided into a plurality of repeat units arranged in an array, each repeat units includes a plurality of sub-units arranged in an array; in each repeat units, a first sub-unit, a second sub-unit and a third sub-unit are arranged in both a row direction and a column direction; and each of the first sub-unit, the second sub-unit and the third sub-unit includes at least two color sub-pixels and at least two highlight sub-pixels; in each sub-unit, a total number of the color sub-pixel is equal to a total number of the highlight sub-pixel; a total number of the first, second and third color sub-pixel in each sub-unit is the same.

9 Claims, 19 Drawing Sheets

(52) U.S. Cl.
  CPC ............ *G02F 2001/134345* (2013.01); *G02F 2201/52* (2013.01)

(56) References Cited

U.S. PATENT DOCUMENTS

| | | | | |
|---|---|---|---|---|
| 2012/0274870 | A1* | 11/2012 | Liu | G02F 1/136259 349/55 |
| 2013/0050282 | A1* | 2/2013 | Kim | G09G 3/3413 345/690 |
| 2014/0347586 | A1* | 11/2014 | Wang | G02F 1/13394 349/43 |
| 2016/0070135 | A1* | 3/2016 | Im | G02F 1/133514 349/96 |
| 2016/0255339 | A1* | 9/2016 | Du | G09G 3/20 345/694 |
| 2017/0148818 | A1* | 5/2017 | Jia | G02F 1/136286 |

* cited by examiner

FIG. 5

FIG. 6

LIQUID CRYSTAL DISPLAY PANEL AND LIQUID CRYSTAL DISPLAY DEVICE

CROSS-REFERENCE TO RELATED APPLICATIONS

The present application claims the benefit of priority to Chinese Patent Application No. 201710473985.3, filed on Jun. 21, 2017, the content of which is incorporated herein by reference in its entirety.

TECHNICAL FIELD

The present disclosure relates to the field of display technologies and, particularly, relates to a liquid crystal display panel and a liquid crystal display device.

BACKGROUND

Generally, in traditional display panels, each pixel adopts a three-color sub-pixel structure of RGB (Red, Green and Blue). In order to improve brightness of the display panel and reduce power consumption of the display panel, recently, in the prior art, each pixel in the display panel includes a red sub-pixel, a green sub-pixel, a blue sub-pixel and a highlight sub-pixel.

It is found that, in the prior art, a ratio of an area of the highlight sub-pixels to a total area of all the sub-pixels is 1:4, the ratio is small, which cannot satisfy the requirements on a display panel with high transmittance.

SUMMARY

In view of the above, embodiments of the present disclosure provide a liquid crystal display panel and a liquid crystal display device, so as to improve the area occupied by the highlight sub-pixels with respect to all the sub-pixels, thereby improving the transmittance of the display panel.

In a first aspect, embodiments of the present disclosure provide a liquid crystal display panel, including: a first substrate; a second substrate placed opposite to the first substrate; and a liquid crystal layer arranged between the first substrate and the second substrate; wherein the first substrate includes a plurality of sub-pixels, the plurality of sub-pixels is divided into a plurality of repeat units arranged in an array, each of the plurality of repeat units includes a plurality of sub-units arranged in an array; in each of the plurality of repeat units, a first sub-unit, a second sub-unit and a third sub-unit are arranged in both a row direction and a column direction; and wherein each of the first sub-unit, the second sub-unit and the third sub-unit includes at least two color sub-pixels and at least two highlight sub-pixels, each of the color sub-pixels is a first color sub-pixel, a second color sub-pixel or a third color sub-pixel; in each of the first sub-unit, the second sub-unit and the third sub-unit, a total number of the color sub-pixel is equal to a total number of the highlight sub-pixel; a total number of the first color sub-pixel in the first sub-unit, the second sub-unit and the third sub-unit, a total number of the second color sub-pixel in the first sub-unit, the second sub-unit and the third sub-unit and a total number of the third color sub-pixel in the first sub-unit, the second sub-unit and the third sub-unit are identical to each other.

In a second aspect, embodiments of the present disclosure provide a liquid crystal display device including a liquid crystal display panel, wherein the liquid crystal display panel includes: a first substrate; a second substrate placed opposite to the first substrate; and a liquid crystal layer arranged between the first substrate and the second substrate; wherein the first substrate includes a plurality of sub-pixels, the plurality of sub-pixels is divided into a plurality of repeat units arranged in an array, each of the plurality of repeat units includes a plurality of sub-units arranged in an array; in each of the plurality of repeat units, a first sub-unit, a second sub-unit and a third sub-unit are arranged in both a row direction and a column direction; and wherein each of the first sub-unit, the second sub-unit and the third sub-unit includes at least two color sub-pixels and at least two highlight sub-pixels, each of the color sub-pixels is a first color sub-pixel, a second color sub-pixel or a third color sub-pixel; in each of the first sub-unit, the second sub-unit and the third sub-unit, a total number of the color sub-pixel is equal to a total number of the highlight sub-pixel; a total number of the first color sub-pixel in the first sub-unit, the second sub-unit and the third sub-unit, a total number of the second color sub-pixel in the first sub-unit, the second sub-unit and the third sub-unit and a total number of the third color sub-pixel in the first sub-unit, the second sub-unit and the third sub-unit are identical to each other.

The embodiments of the present disclosure provides a liquid crystal display panel and a liquid crystal display device, the first substrate of the liquid crystal display panel is provided with a plurality of sub-pixels, the sub-pixels are divided into a plurality of repeat units arranged in an array, each repeat unit includes a plurality of sub-units arranged in an array. In each repeat unit, a first sub-unit, a second sub-unit and a third sub-unit are arranged in a row direction and a column direction, each of the first sub-unit, the second sub-unit and the third sub-unit includes at least two color sub-pixels and at least two highlight sub-pixels. The total number of the first color sub-pixel in the first sub-unit, the second sub-unit and the third sub-unit, the total number of the second color sub-pixel in the first sub-unit, the second sub-unit and the third sub-unit, and the total number of the third color sub-pixel in the first sub-unit, the second sub-unit and the third sub-unit are identical to each other, so that the liquid crystal display panel can achieve a full-color display, and the number of the color sub-pixel in each sub-unit is equal to the total number of the highlight sub-pixel in each sub-unit, so that the area of the highlight sub-pixel in each sub-unit occupies 50%, which is far higher than 25% in the prior art, therefore, the area ratio of the highlight sub-pixels to all the sub-pixels can be significantly improved, so as to improve transmittance of the display panel.

BRIEF DESCRIPTION OF DRAWINGS

In order to illustrate technical solutions in embodiments of the present disclosure more clearly, a brief introduction of the drawings used in the embodiments will be provided herein. Obviously, the drawings described below are merely some embodiments of the present disclosure, those skilled in the art can also obtain other drawings according to these drawings without creative work.

FIG. 5 illustrates a third schematic diagram of an arrangement of sub-pixels according to an embodiment of the present disclosure;

FIG. 6 illustrates a fourth schematic diagram of an arrangement of sub-pixels according to an embodiment of the present disclosure;

DESCRIPTION OF EMBODIMENTS

In order to better understand technical solutions of the present disclosure, the present disclosure will be described in detail with reference to the drawings.

It should be noted that, the embodiments described are only a part of embodiments of the present disclosure, rather than all of the embodiments. Based on the embodiments in the present disclosure, all other embodiments obtained by those skilled in the art without creative work shall belong to the protection scope of the present disclosure.

The terms used in the embodiments of the present disclosure are only for describing specific embodiments, which are not intended to limit the present disclosure. The singular form of 'a', 'an', 'the' and 'said' used in the embodiments of the present disclosure and the appended claims is intended to include the plural form, unless otherwise clearly indicated in the context.

It should be understood that, although the embodiments of the present disclosure adopts terms of first, second, third and the like to describe the color sub-pixels, but these color sub-pixels should not be limited by these terms. These terms are only used to distinguish among the color sub-pixels. For example, without departing from the scope of the embodiments of the present disclosure, a first color sub-pixel can also be called as a second color sub-pixel, similarly, a second color sub-pixel can also be called as a first color sub-pixel.

Figures 1, 2:
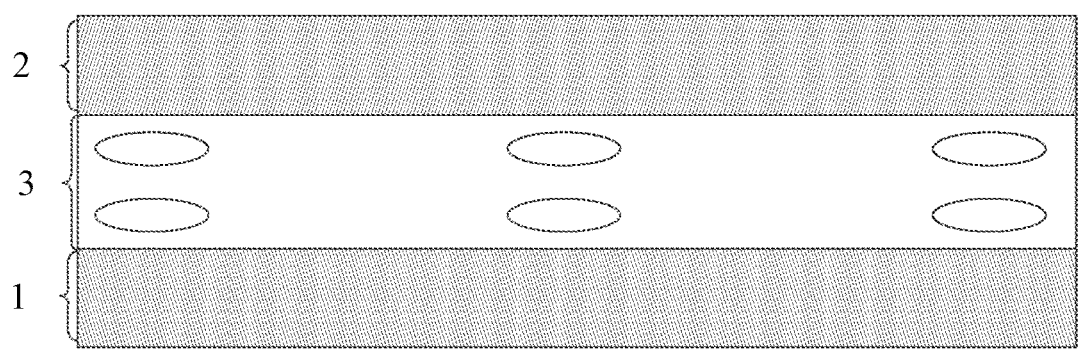
FIG. 1 illustrates a top view of the display panel in the prior art.
FIG. 2 illustrates a cross-sectional schematic diagram of a liquid crystal display panel according to an embodiment of the present disclosure.

As shown in FIG. 1, FIG. 1 is a top view of a display panel in the prior art. Each pixel (shown in the dotted frame in FIG. 1) in the display panel includes a red sub-pixel (indicated by R in FIG. 1), a green sub-pixel (indicated by G in FIG. 1), a blue sub-pixel (indicated by B in FIG. 1) and a highlight sub-pixel (indicated by W in FIG. 1).

An embodiment of the present disclosure provides a liquid crystal display panel, as shown in FIG. 2, FIG. 2 illustrates a cross-sectional schematic diagram of a liquid crystal display panel according to an embodiment of the present disclosure, the liquid crystal display panel includes a first substrate 1 and a second substrate 2 arranged opposite to the first substrate 1, for example, the first substrate 1 is an array substrate, the second substrate 2 is a color film substrate, a liquid crystal layer 3 is provided between the first substrate 1 and the second substrate 2.

Figure 3:
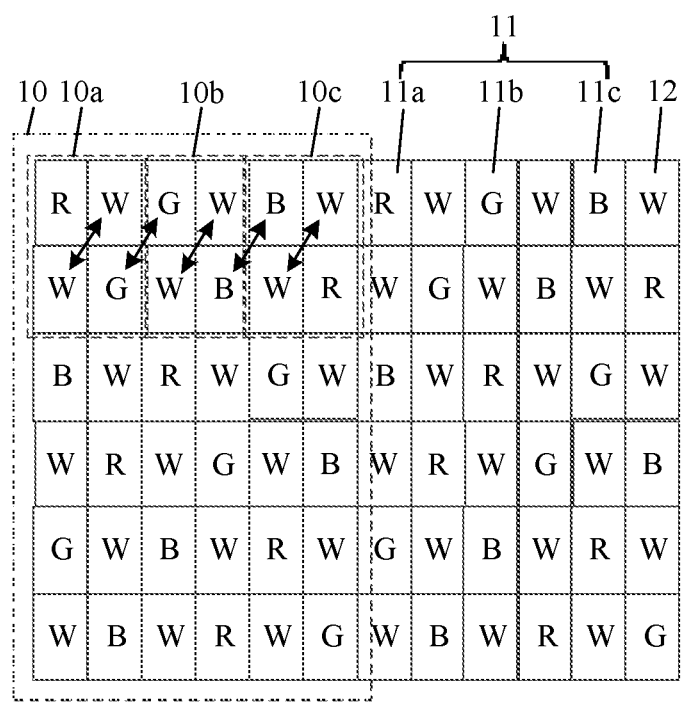
FIG. 3 illustrates a first schematic diagram of an arrangement of sub-pixels according to an embodiment of the present disclosure.

As shown in FIG. 3, FIG. 3 illustrates a first schematic diagram of an arrangement of sub-pixels according to an embodiment of the present disclosure, the first substrate 1 are provided with a plurality of sub-pixels, all the sub-pixels are divided into a plurality of repeat units 10 arranged in an array, each repeat unit 10 includes a plurality of sub-units arranged in an array. A first sub-unit 10a, a second sub-unit 10b and a third sub-unit 10c are arranged in each repeat unit 10 in a row direction and a column direction.

Moreover, each of the first sub-unit 10a, the second sub-unit 10b and the third sub-unit 10c includes at least two color sub-pixels 11 and at least two highlight sub-pixels 12, the color sub-pixel 11 is a first color sub-pixel 11a, a second color sub-pixel 11b or a third color sub-pixel 11c, the total number of the color sub-pixel 11 in each sub-unit is equal to the total number of the highlight sub-pixel 12 in each sub-unit. The total number of the first color sub-pixel 11a in the first sub-unit 10a, the second sub-unit 10b and the third sub-unit 10c, the total number of the second color sub-pixel 11b in the first sub-unit 10a, the second sub-unit 10b and the third sub-unit 10c, and the total number of the third color sub-pixel 11c in the first sub-unit 10a, the second sub-unit 10b and the third sub-unit 10c are identical to each other.

Figure 4:
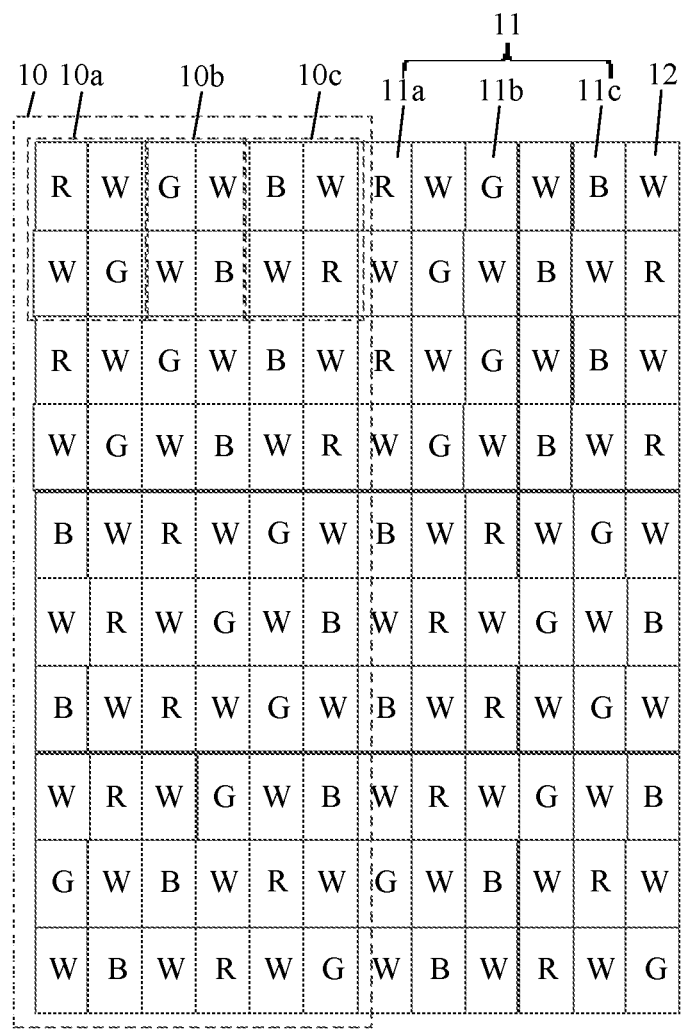
FIG. 4 illustrates a second schematic diagram of an arrangement of sub-pixels according to an embodiment of the present disclosure.

It should be noted that, the above-mentioned 'a first sub-unit 10a, a second sub-unit 10b and a third sub-unit 10c are arranged in each repeat unit 10 in a row direction and a column direction' is not limited by situation shown in FIG. 3 that only one first sub-unit 10a, one second sub-unit 10b and one third sub-unit 10c are arranged in the row direction and the column direction in each repeat unit 10, further, the situation that a plurality of first sub-units 10a, a plurality of second sub-units 10b and a plurality of third sub-units 10c are arranged in the row direction and the column direction in each repeat unit 10 can also be included, for example, as shown in FIG. 4, FIG. 4 illustrates a second schematic diagram of an arrangement of sub-pixels according to an embodiment of the present disclosure, in each repeat unit 10, one first sub-unit 10a, one second sub-unit 10b and one third sub-unit 10c are arranged in the row direction, and two first sub-units 10a, two second sub-units 10b and two third sub-units 10c are arranged in the column direction.

Since the total number of the first color sub-pixel 11a in the first sub-unit 10a, the second sub-unit 10b and the third sub-unit 10c, the total number of the second color sub-pixel 11b in the first sub-unit 10a, the second sub-unit 10b and the third sub-unit 10c, and the total number of the third color sub-pixel 11c in the first sub-unit 10a, the second sub-unit 10b and the third sub-unit 10c are identical to each other, the liquid crystal display panel can achieve full-color display, and since the total number of the color sub-pixel 11 in each sub-unit is equal to the total number of the highlight sub-pixel 12 in each sub-unit, the area of the highlight sub-pixels in each sub-unit accounts for 50%, which is far higher than 25% in the prior art, therefore, the area ratio of the highlight sub-pixels 12 to all the sub-pixels can be significantly improved, so as to improve the transmittance of the display panel.

Figures 5, 6:
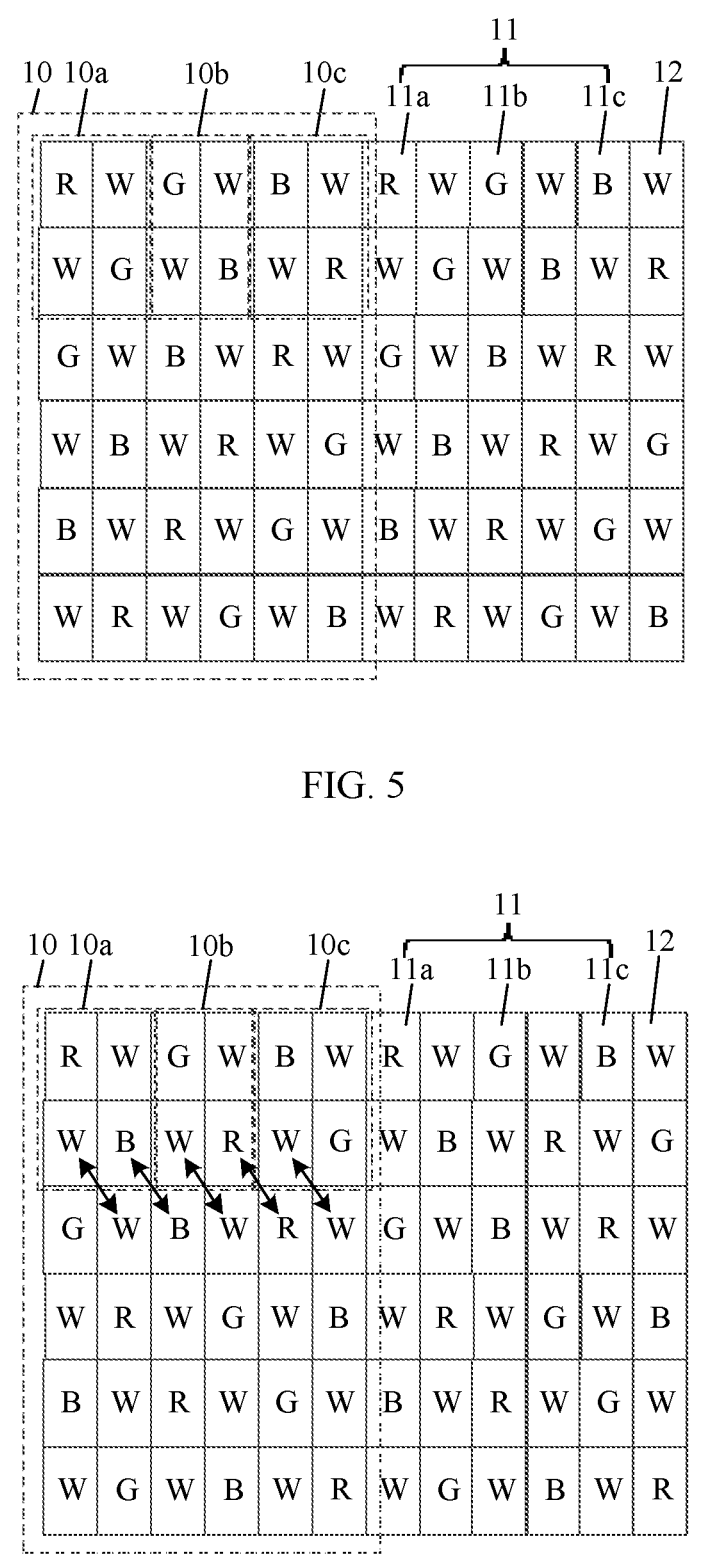

It is known from the above that, the number of the sub-pixel included by each repeat unit 10 can be varied, for example, as shown in FIG. 3 and FIG. 5, FIG. 5 illustrates a third schematic diagram of an arrangement of sub-pixels according to an embodiment of the present disclosure. Each repeat unit 10 includes sub-units arranged in a 3*3 array, i.e., 9 sub-units, the 9 sub-units included by each repeat unit 10 include three first sub-units 10a, three second sub-units 10b and three third sub-units 10c. Therefore, the repeat unit 10 has a simple structure, and the distribution of the sub-pixels on the entire first substrate 1 is uniform, thus display effect is better. Optionally, as shown in FIG. 3, the first row of the repeat unit 10 is successively arranged with a first sub-unit 10a, a second sub-unit 10b and a third sub-unit 10, the second row is successively arranged with a third sub-unit 10c, a first sub-unit 10a and a second sub-unit 10b, the third row is successively arranged with a second sub-unit 10b, a third sub-unit 10c and a first sub-unit 10a; or, as shown in FIG. 5, the first row of the repeat unit 10 is successively arranged with a first sub-unit 10a, a second sub-unit 10b and a third sub-unit 10, the second row is successively arranged with a second sub-unit 10b, a third sub-unit 10c and a first sub-unit 10a, the third row is successively arranged with a third sub-unit 10c, a first sub-unit 10a and a second sub-unit 10b.

Optionally, as shown in FIG. 3 and FIG. 5, in each row of sub-pixels of the repeat unit 10, the number of the first color sub-pixel 11a, the number of the second color sub-pixel 11b and the number of the third color sub-pixel 11c are identical to each other, and the total number of the color sub-pixel 11 is equal to the total number of the highlight sub-pixel 12; in each column of sub-pixels of the repeat unit 10, the number of the first color sub-pixel 11a, the number of the second color sub-pixel 11b and the number of the third color sub-pixel 11c are identical to each other, and the total number of the color sub-pixel 11 is equal to the total number of the highlight sub-pixel 12, so that each row and each column of the repeat unit 10 can individually display full-color and high brightness, which is advantage to improve the display effect of the liquid crystal display panel.

Based on the above-mentioned contents, there are various numbers of sub-pixels and arrangement manners thereof in the first sub-unit 10a, the second sub-unit 10b and the third sub-unit 10c, which will be illustrated by example as follows.

For example, as shown in FIG. 3, FIG. 6, FIG. 7, FIG. 8 and FIG. 9, FIGS. 6-9 are fourth to seventh schematic diagrams of arrangement manners of the sub-pixel according to the embodiments of the present disclosure. Each of the first sub-unit 10a, the second sub-unit 10b and the third sub-unit 10c includes sub-pixels arranged in a 2*2 array, each sub-unit includes two color sub-pixels 11 and two highlight sub-pixels 12. There are various arrangement manners of the sub-pixels in a 2*2 array included by the first sub-unit 10a, the second sub-unit 10b and the third sub-unit 10c.

In a first manner, as shown in FIG. 3, the first sub-unit 10a includes a first color sub-pixel 11a, a second color sub-pixel 11b and two highlight sub-pixels 12, and the first row of the first sub-unit 10a is successively arranged with the first color sub-pixel 11a and the highlight sub-pixel 12, the second row is successively arranged with the highlight sub-pixel 12 and the second color sub-pixel 11b; the second sub-unit 10b includes a second color sub-pixel 11b, a third color sub-pixel 11c and two highlight sub-pixels 12, and the first row of the second sub-unit 10b is successively arranged with the second color sub-pixel 11b and the highlight sub-pixel 12, the second row is successively arranged with the highlight sub-pixel 12 and the third color sub-pixel 11c; the third sub-unit 10c includes a third color sub-pixel 11c, a first color sub-pixel 11a and two highlight sub-pixels 12, the first row of the third sub-unit 10c is successively arranged with the third color sub-pixel 11c and the highlight sub-pixel 12, the second row is successively arranged with the highlight sub-pixel 12 and the first color sub-pixel 11a.

Figure 10:
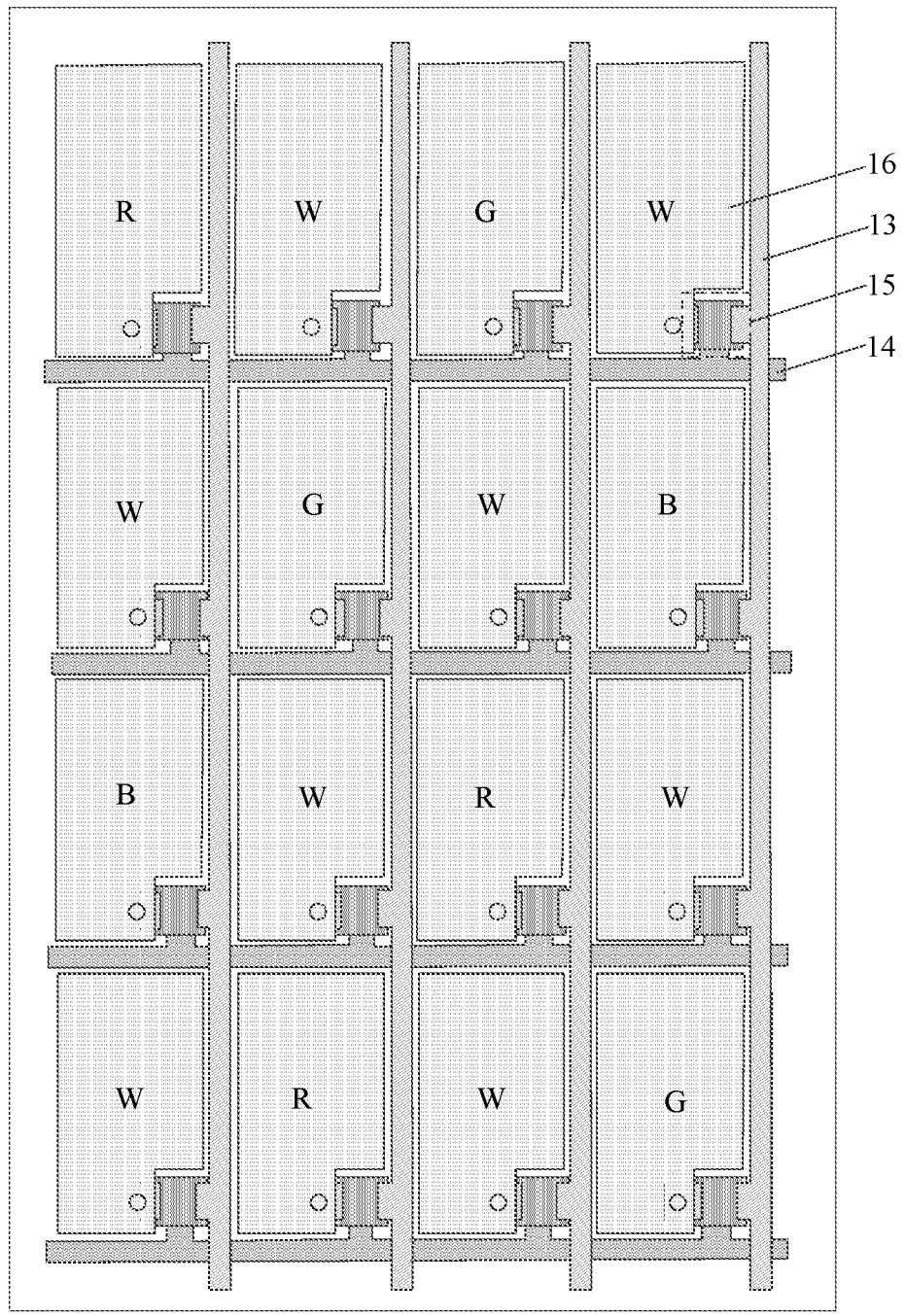
FIG. 10 illustrates a top view of a first substrate according to an embodiment of the present disclosure.

As shown in FIG. 10, FIG. 10 illustrates a top view of a first substrate 1 according to an embodiment of the present disclosure. The first substrate 1 is provided with gate lines 14 and data lines 13 intersecting with the gate lines 14, and each sub-pixel is correspondingly provided with a thin film transistor 15 and a pixel electrode 16. The gate electrode of the thin film transistor 15 is electrically connected with the gate line 14, the source electrode is electrically connected with the data line 13, and the drain electrode is electrically connected with the pixel electrode 16. The gate lines 14 are successively applied with a scan signal to turn on the thin film transistor 15, and a data signal is applied on the data lines 13, so that the data signal can be written on the pixel electrode 16 to display when the thin film transistor 15 is turned on. Correspondingly, the second substrate 2 is provided with a grid shaped black matrix, configured to block the gate line 14, data line 13 and the thin film transistor 15. The grid shaped black matrix is filled with a color filter, the color filter includes a first colored color filter, a second colored color filter, a third colored color filter and a highlight color filter, where the first colored color filter, the second colored color filter, the third colored color filter and the highlight color filter are respectively corresponding to the first color sub-pixel 11a, the second color sub-pixel 11b, the third color sub-pixel 11c and the highlight sub-pixel 12. The arrangement manner of the gate lines 14 and the data lines 13 on the first substrate 1 is closely related to the arrangement manner of the sub-pixels on the first substrate 1.

Figure 11:
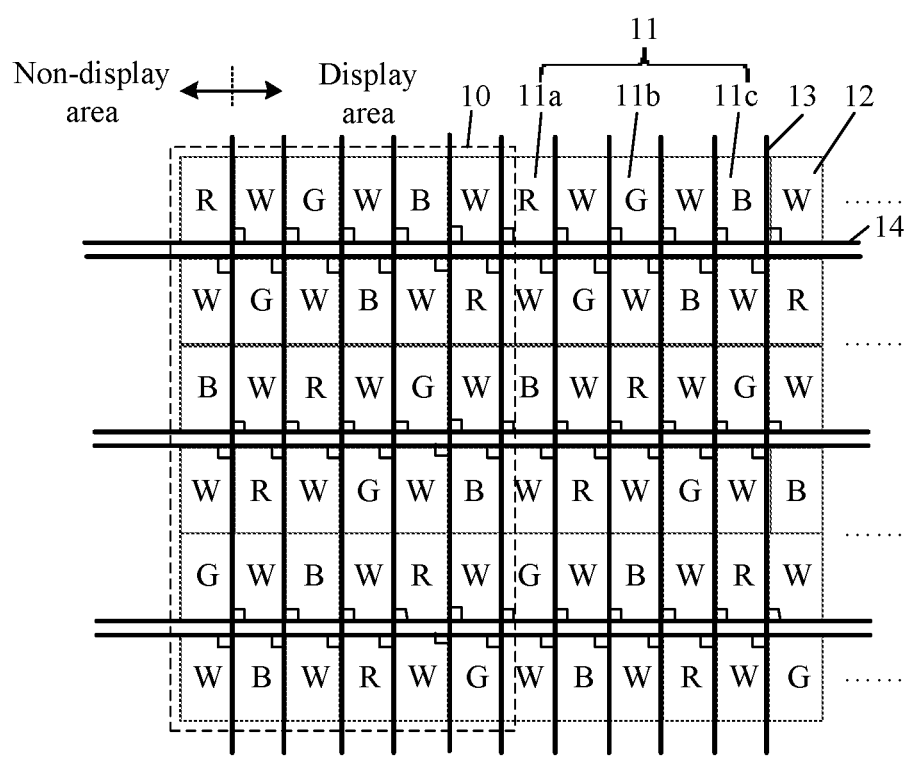
FIG. 11 illustrates a top view of a first substrate corresponding to FIG. 3 according to an embodiment of the present disclosure.

It can be seen from FIG. 3 that, in such arrangement manner, the first row and the second row (or the third row and the fourth row etc.) of sub-pixels of the repeat unit 10 are identical in the shown direction, that is, both the two sub-pixels indicated by each arrow are the first color sub-pixels 11a, the second color sub-pixels 11b, the third color sub-pixels 11c or the highlight sub-pixels 12. Based on this, the embodiment of the present disclosure provides an arrangement manner of the data lines and the gate lines on the first substrate 1, as shown in FIG. 11, FIG. 11 illustrates a top view of a first substrate corresponding to FIG. 3 according to an embodiment of the present disclosure. A data line 13 is arranged between the $x^{th}$ column of sub-pixels and the $(x+1)^{th}$ column of sub-pixels, the data line 13 corresponds to the even sub-pixels of the $x^{th}$ column of sub-pixels (FIG. 11 uses a short transverse line to show the corresponding relation, situations in the following figures are the same), and is corresponding to the odd sub-pixels of the $(x+1)^{th}$ column of sub-pixels, where x is an integer greater than or equal to 1; two gate lines 14 are arranged between the $(2y+1)^{th}$ row of sub-pixels and the $(2(y+1))^{th}$ row of sub-pixels, the gate line 14 close to the $(2y+1)^{th}$ row of sub-pixels corresponds to the $(2y+1)^{th}$ row of sub-pixels (FIG. 11 uses a short vertical line to show the corresponding relation, situations in the following figures are the same), the gate line 14 close to the $(2(y+1))^{th}$ row of sub-pixels corresponds to the $(2(y+1))^{th}$ row of sub-pixels, where y is an integer greater than or equal to 0.

For example, as shown in FIG. 11, a data line 13 is arranged between the first column of sub-pixels and the second column of sub-pixels, the data line 13 corresponds to the even sub-pixels of the first column of sub-pixels, and corresponds to the odd sub-pixels of the second column of sub-pixels; two gate lines 14 are arranged between the first row of sub-pixels and the second row of sub-pixels, the gate line 14 close to the first row of sub-pixels corresponds to the first row of sub-pixels, and the gate line 14 close to the second row of sub-pixels corresponds to the second row of sub-pixels.

It should be noted that, the odd sub-pixels of the first column of sub-pixels can be individually arranged with a corresponding data line 13, so that the odd sub-pixels of the first column of sub-pixels can display normally, or as shown in FIG. 11, the first column of sub-pixels or more columns of sub-pixels can be located in the non-display region, so that even the odd sub-pixels of the first column of sub-pixels cannot display, it may not influence the normal display of the display region. Those skilled in the art can select either of the above two manners according to actual need, which will not be limited herein.

As shown in FIG. 11, in such an arrangement manner, there exists only a situation that two gate lines 14 or no gate line 14 are arranged between adjacent two rows of sub-pixels. When two gate lines 14 are arranged between adjacent two rows of sub-pixels, the width of the corresponding black matrix is larger than the width of the black matrix when one gate line 14 is arranged therebetween, when no gate line 14 is arranged between adjacent two rows of sub-pixels, the width of the corresponding black matrix is smaller than the width of the black matrix when one gate line 14 is arranged therebetween, and the width difference between the black matrix corresponding to the situation of two gate lines 14 being provided and the black matrix corresponding to the situation of one gate line 14 being provided is smaller than the width difference between the black matrix corresponding to the situation of one gate lines 14 being provided and the black matrix corresponding to the situation of no gate line 14 being provided, which make the total area of the black matrix on the second substrate 2 in such an arrangement manner be smaller, so that the area occupied by the black matrix for light shading in the display region of the display panel is smaller, thus the transmittance of the display panel is higher.

In a second manner, as shown in FIG. 6, the first sub-unit 10a includes a first color sub-pixel 11a, a third color sub-pixel 11c and two highlight sub-pixels 12, and the first row of the first sub-unit 10a is successively arranged with the first color sub-pixel 11a and the highlight sub-pixel 12, the second row is successively arranged with the highlight sub-pixel 12 and the third color sub-pixel 11c; the second sub-unit 10b includes a second color sub-pixel 11b, a first color sub-pixel 11a and two highlight sub-pixels 12, and the first row of the second sub-unit 10b is successively arranged with the second color sub-pixel 11b and the highlight sub-pixel 12, the second row is successively arranged with the highlight sub-pixel 12 and the first color sub-pixel 11a; the third sub-unit 10c includes a third color sub-pixel 11c, a second color sub-pixel 11b and two highlight sub-pixels 12, and the first row of the third sub-unit 10c is successively arranged with the third color sub-pixel 11c and the highlight sub-pixel 12, the second row is successively arranged with the highlight sub-pixel 12 and the second color sub-pixel 11b.

Figure 12:
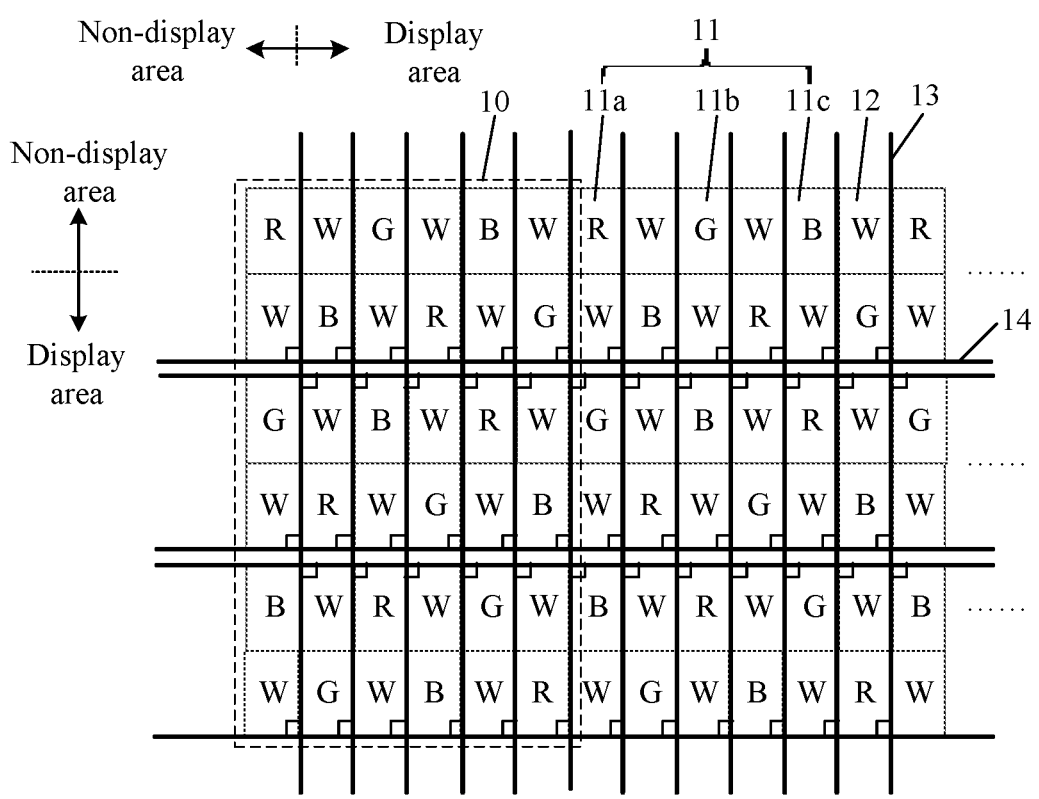
FIG. 12 illustrates a top view of a first substrate corresponding to FIG. 6 according to an embodiment of the present disclosure.

It can be seen from FIG. 6 that, in such an arrangement manner, the second row and the third row (or the fourth row and the fifth row etc.) of sub-pixels of the repeat unit 10 are identical in the shown direction. Based on this, the embodiment of the present disclosure provides an arrangement manner of the data lines and the gate lines on the first substrate 1, as shown in FIG. 12, FIG. 12 illustrates a top view of a first substrate corresponding to FIG. 6 according to an embodiment of the present disclosure. A data line 13 is arranged between the $x_1^{th}$ column of sub-pixels and the $(x_1+1)^{th}$ column of sub-pixels, the data line 13 corresponds to the even sub-pixels of the $x_1^t$ column of sub-pixels, and corresponds to the odd sub-pixels of the $(x_1+1)^t$ column of sub-pixels, $x_1$ is an integer greater than or equal to 1; two gate lines 14 are arranged between the $2y_1^{th}$ row of sub-pixels and the $(2y_1+1)^{th}$ row of sub-pixels, the gate line 14 close to the $2y_1^{th}$ row of sub-pixels corresponds to the $2y_1^{th}$ row of sub-pixels, the gate line 14 close to the $(2y_1+1)^{th}$ row of sub-pixels corresponds to the $(2y_1+1)^{th}$ row of sub-pixels, $y_1$ is an integer greater than or equal to 1.

For example, as shown in FIG. 12, a data line 13 is arranged between the first column of sub-pixels and the second column of sub-pixels, the data line 13 corresponds to the even sub-pixels of the first column of sub-pixels, and corresponds to the odd sub-pixels of the second column of sub-pixels; two gate lines 14 are arranged between the second row of sub-pixels and the third row of sub-pixels, the gate line 14 close to the second row of sub-pixels corresponds to the second row of sub-pixels, and the gate line 14 close to the third row of sub-pixels corresponds to the third row of sub-pixels.

It should be noted that, the odd sub-pixels of the first column of sub-pixels can be individually arranged with a corresponding data line 13, the first row of sub-pixels can be individually arranged with a corresponding gate line 14, so that the odd sub-pixels of the first column and first row of sub-pixels can normally display, or as shown in FIG. 12, the first column of sub-pixels or more columns of sub-pixels can be located in the non-display region, and the first row of sub-pixels or more rows of sub-pixels are located in the non-display region, so that even the odd sub-pixels of the first column of sub-pixels and the first row of sub-pixels cannot display, it may not influence the normal display of the display region. Those skilled in the art can select either of the above two manners according to actual need, which will not be limited herein.

As shown in FIG. 12, in such an arrangement manner, there exists only a situation that two gate lines 14 or no gate line 14 are arranged between adjacent two rows of sub-pixels. When two gate lines 14 are arranged between adjacent two rows of sub-pixels, the width of the corresponding black matrix is larger than the width of the black matrix when one gate line 14 is arranged therebetween, when no gate line 14 is arranged between adjacent two rows of sub-pixels, the width of the corresponding black matrix is smaller than the width of the black matrix when one gate line 14 is arranged therebetween, and the width difference between the black matrix corresponding to the situation of two gate lines 14 being provided and the black matrix corresponding to the situation of one gate line 14 being provided is smaller than the width difference between the black matrix corresponding to the situation of one gate lines 14 being provided and the black matrix corresponding to the situation of no gate line 14 being provided, which makes the total area of the black matrix on the second substrate 2 in such an arrangement manner is smaller, so that the area occupied by the black matrix for light shading in the display region of the display panel is smaller, thus the transmittance of the display panel is higher.

Figure 7:
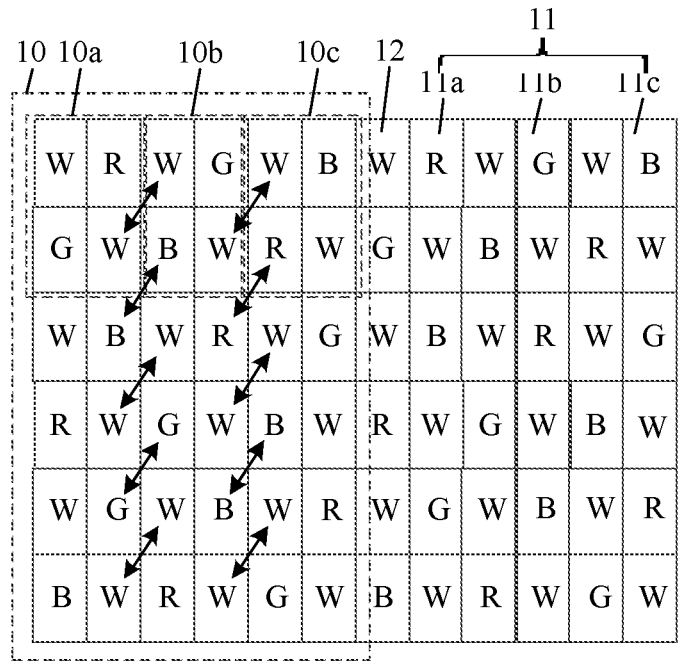
FIG. 7 illustrates a fifth schematic diagram of an arrangement of sub-pixels according to an embodiment of the present disclosure.

In a third manner, as shown in FIG. 7, the first sub-unit 10a includes a first color sub-pixel 11a, a second color sub-pixel 11b and two highlight sub-pixels 12, and the first row of the first sub-unit 10a is successively arranged with the highlight sub-pixel 12 and the first color sub-pixel 11a, the second row is successively arranged with the second color sub-pixel 11b and the highlight sub-pixel 12; the second sub-unit 10b includes a second color sub-pixel 11b, a third color sub-pixel 11c and two highlight sub-pixels 12, the first row of the second sub-unit 10b is successively arranged with the highlight sub-pixel 12 and the second color sub-pixel 11b, the second row is successively arranged with the third color sub-pixel 11c and the highlight sub-pixel 12; the third sub-unit 10c includes a first color sub-pixel 11a, a third color sub-pixel 11c and two highlight sub-pixels 12, and the first row of the third sub-unit 10c is successively arranged with the highlight sub-pixel 12 and the third color sub-pixel 11c, the second row is successively arranged with the first color sub-pixel 11a and the highlight sub-pixel 12.

Figure 13:
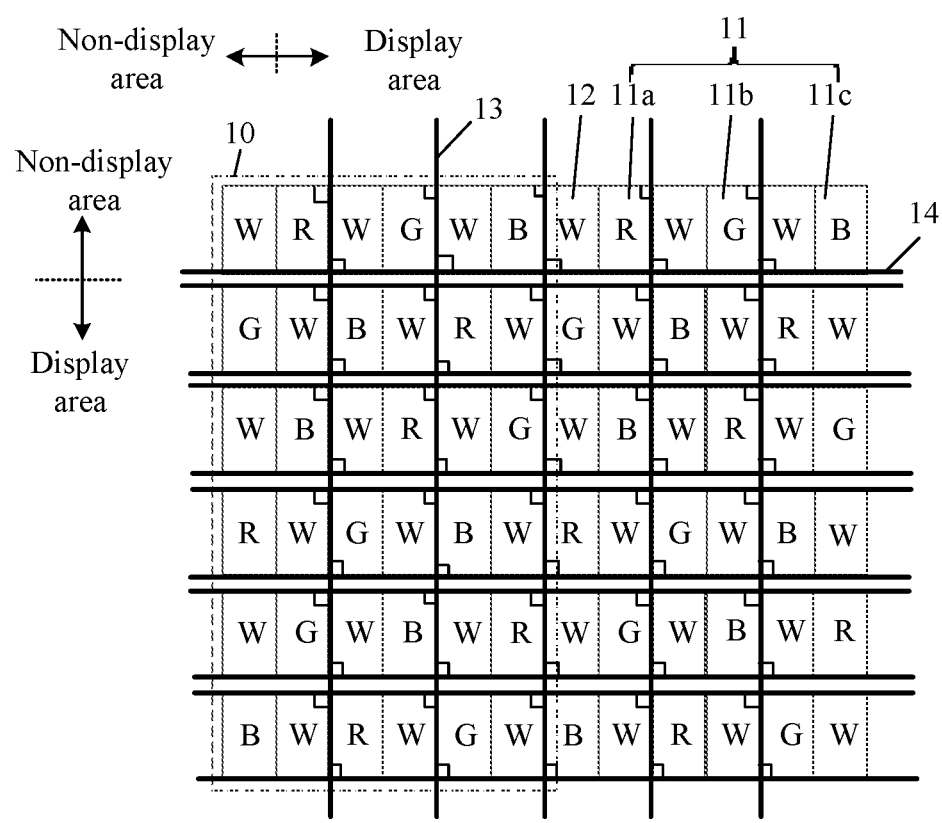
FIG. 13 illustrates a first top view of a first substrate corresponding to FIG. 7 according to an embodiment of the present disclosure.

It can be seen from FIG. 7 that, in such an arrangement manner, the second column and the third column (or the fourth column and the fifth column etc.) of sub-pixels of the repeat unit 10 are identical in the shown direction. Based on this, the embodiment of the present disclosure provides an arrangement manner of the data lines and the gate lines on the first substrate 1, as shown in FIG. 13, FIG. 13 illustrates a top view of a first substrate 1 corresponding to FIG. 7 according to an embodiment of the present disclosure. A data line 13 is arranged between the $2x_2^{th}$ column of sub-pixels and the $(2x_2+1)^{th}$ column of sub-pixels, the data line 13 corresponds to both the $2x_2^{th}$ column of sub-pixels and the $(2x_2+1)^{th}$ column of sub-pixels, $x_2$ is an integer greater than or equal to 1; two gate lines 14 are arranged between the $y_2^{th}$ row of sub-pixels and the $(y_2+1)^{th}$ row of sub-pixels, the gate line 14 close to the $y_2^{th}$ row of sub-pixels corresponds to odd sub-pixels of the $y_2^{th}$ row of sub-pixels, the gate line 14 close to the $(y_2+1)^{th}$ row of sub-pixels corresponds to the even sub-pixels of the $(y_2+1)^{th}$ row of sub-pixels, $y_2$ is an integer greater than or equal to 1.

For example, as shown in FIG. 13, a data line 13 is arranged between the second column of sub-pixels and the third column of sub-pixels, the data line 13 corresponds to both the second column of sub-pixels and the third column of sub-pixels; two gate lines 14 are arranged between the first row of sub-pixels and the second row of sub-pixels, the gate line 14 close to the first row of sub-pixels corresponds to the odd sub-pixels of the first row of sub-pixels, the gate line 14 close to the second row of sub-pixels corresponds to the even sub-pixels of the second row of sub-pixels.

It should be noted that, the first column of sub-pixels can be individually arranged with a corresponding data line 13, the odd sub-pixels of the first row of sub-pixels can be individually arranged with a corresponding gate line 14, so that the first column of sub-pixels and the odd sub-pixels of the first row of sub-pixels can display normally, or as shown in FIG. 13, the first column of sub-pixels or more columns of sub-pixels can be located in the non-display region, and the first row of sub-pixels or more rows of sub-pixels can be located in the non-display region, so that even the first column of sub-pixels and the odd sub-pixels of the first row of sub-pixels cannot display, it may not influence the normal display of the display region. Those skilled in the art can select either of the above two manners according to actual need, which will not be limited herein.

As shown in FIG. 13, in such an arrangement manner, adjacent two columns of sub-pixels share one data line 13, so as to effectively reduce the number of the data line 13; two gate lines 14 are arranged between adjacent two rows of sub-pixels, and each row of sub-pixels is respectively controlled by the two gate lines 14, one gate line 14 controls the odd sub-pixels, the other gate line 14 controls the even sub-pixels, so that the control of the gate line 14 to the sub-pixels is more accurate, thus the display effect is better.

Figure 14:
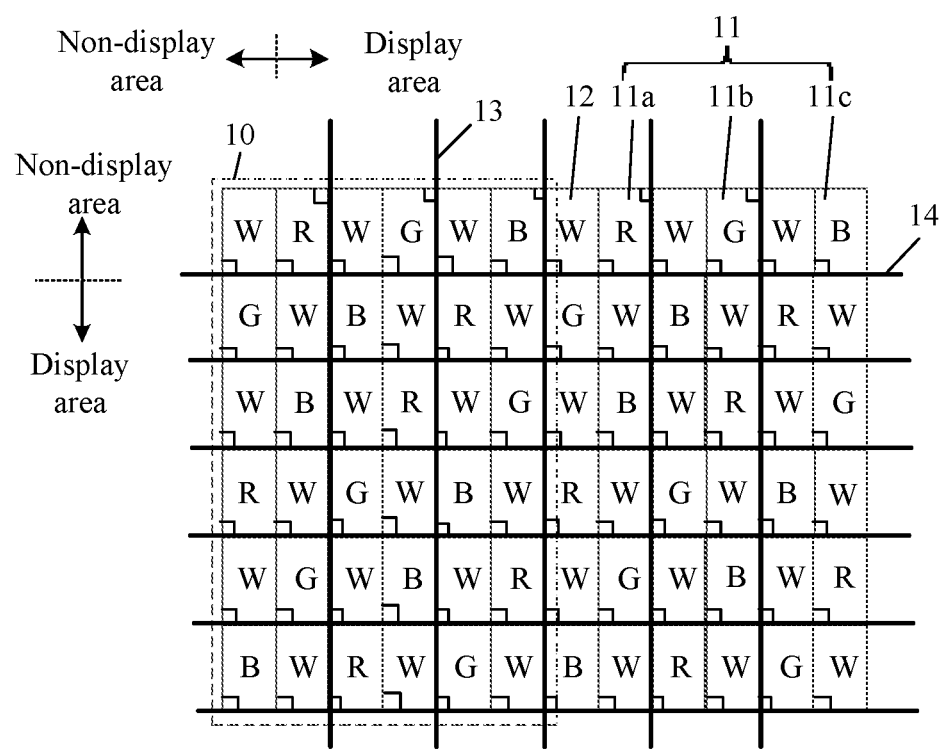
FIG. 14 illustrates a second top view of a first substrate corresponding to FIG. 7 according to an embodiment of the present disclosure.

Absolutely, as shown in FIG. 14, FIG. 14 illustrates a second top view of a first substrate corresponding to FIG. 7 according to an embodiment of the present disclosure. While a data line 13 is shared by adjacent two columns of sub-pixels, a gate line is individually arranged for each row of sub-pixels to control an entire row of sub-pixels, which effectively reduces the number of the data line 13 and, at the same time, significantly reduces the area of the black matrix corresponding to the data line 13, but the area of the black matrix corresponding to the gate line 14 is not changed, so that the total area of the black matrix on the second substrate 2 is smaller, the area occupied by the black matrix for light shading in the display region of the display panel is smaller, thus the transmittance of the display panel is higher.

Figure 8:
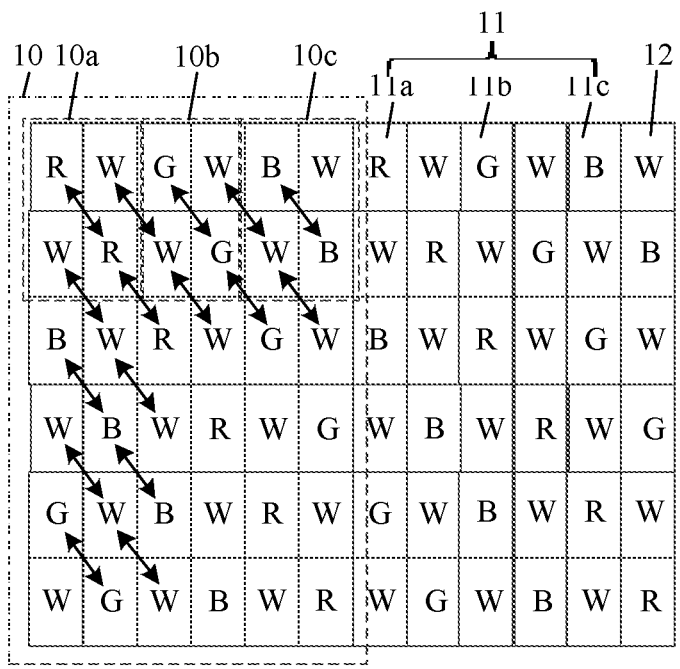
FIG. 8 illustrates a sixth schematic diagram of an arrangement of sub-pixels according to an embodiment of the present disclosure.
Figure 9:
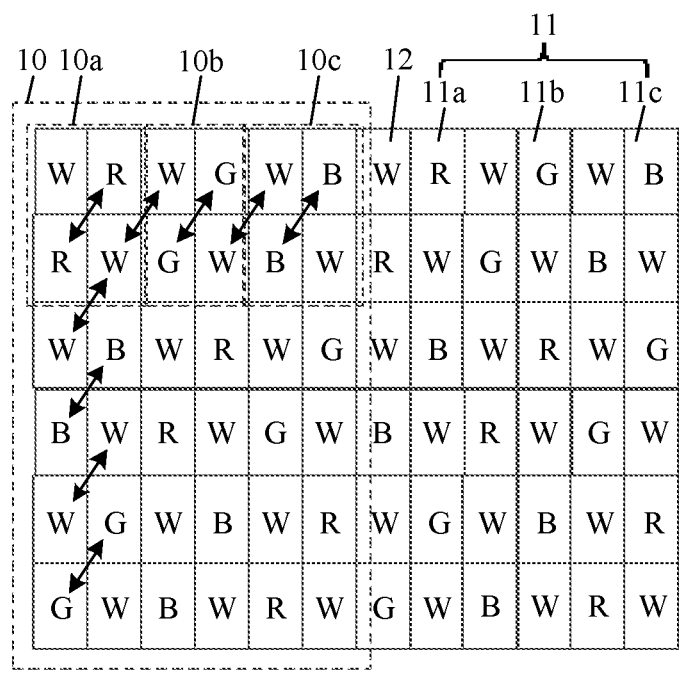
FIG. 9 illustrates a seventh schematic diagram of an arrangement of sub-pixels according to an embodiment of the present disclosure.

In a fourth manner, as shown in FIG. 8 and FIG. 9, the first sub-unit 10a includes two first color sub-pixels 11a and two highlight sub-pixels 12, the second sub-unit 11b includes two second color sub-pixels 11b and two highlight sub-pixels 12, and the third sub-unit 10c includes two third color sub-pixels 11c and two highlight sub-pixels 12. In each of the first sub-unit 10a, the second sub-unit 10b and the third sub-unit 10c, the corresponding color sub-pixels and highlight sub-pixels 12 are successively arranged in a row, the highlight sub-pixels 12 and the corresponding color sub-pixels are successively arranged in the other row. As shown in FIG. 8, in each of the first sub-unit 10a, the second sub-unit 10b and the third sub-unit 10c, the corresponding color sub-pixels and the highlight sub-pixels 12 are successively arranged in the first row, the highlight sub-pixels 12 and the corresponding color sub-pixels are successively arranged in the second row. As shown in FIG. 9, in each of the first sub-unit 10a, the second sub-unit 10b and the third sub-unit 10c, the highlight sub-pixels 12 and the corresponding color sub-pixels are successively arranged in the first row, the corresponding color sub-pixels and the highlight sub-pixels 12 are successively arranged in the second row. It should be noted that, the color of the color sub-pixel included in the first sub-unit 10a in FIG. 8 and the color of the color sub-pixel included in the first sub-unit 10a in FIG. 9 are the same, for example, both are the first color sub-pixel 11a; the color of the color sub-pixel included in the second sub-unit 10b in FIG. 8 and the color of the color sub-pixel included in the second sub-unit 10b in FIG. 9 are the same, for example, both are the second color sub-pixel 11b; the color of the color sub-pixel included in the third sub-unit 10c in FIG. 8 and the color of the color sub-pixel included in the third sub-unit 10c in FIG. 9 are the same, for example, both are the third color sub-pixel 11c.

Figure 15:
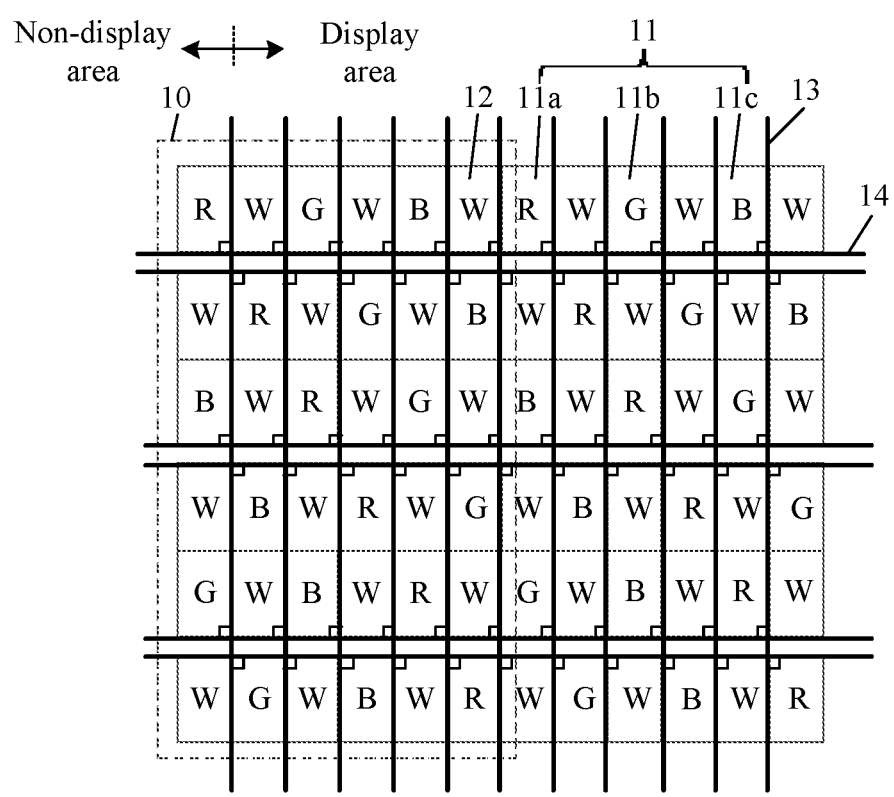
FIG. 15 illustrates a first top view of a first substrate corresponding to FIG. 8 according to an embodiment of the present disclosure.

It can be seen from FIG. 8 that, in the arrangement manner shown in FIG. 8, the first row and the second row (or the third row and the fourth row etc.) of sub-pixels of the repeat unit 10 are identical in the direction indicated by the arrow, and the first column and the second column (or the third column and the fourth column etc.) of sub-pixels are identical in the direction indicated by the arrow. Based on this, the embodiment of the present disclosure provides two arrangement manners of the data lines and the gate lines on the first substrate 1:

Manner one, as shown in FIG. 15, FIG. 15 illustrates a first top view of a first substrate corresponding to FIG. 8 according to an embodiment of the present disclosure. A data line 13 is arranged between the $x_3^{th}$ column of sub-pixels and the $(x_3+1)^{th}$ column of sub-pixels, the data line 13 corresponds to the odd sub-pixels of the $x_1^t$ column of sub-pixels, and corresponds to the even sub-pixels of the $(x_3+1)^{th}$ column of sub-pixels, $x_3$ is an integer greater than or equal to 1; two gate lines 14 are arranged between the $(2y_3+1)^{th}$ row of sub-pixels and the $(2(y_3+1))^{th}$ row of sub-pixels, the gate line 14 close to the $(2y_3+1)^{th}$ row of sub-pixels corresponds to the $(2y_3+1)^{th}$ row of sub-pixels, the gate line 14 close to the $(2(y_3+1))^{th}$ row of sub-pixels corresponds to the $(2(y_3+1))^{th}$ row of sub-pixels, $y_3$ is an integer greater than or equal to 0.

For example, as shown in FIG. 15, a data line 13 is arranged between the first column of sub-pixels and the second column of sub-pixels, the data line 13 corresponds to the odd sub-pixels of the first column of sub-pixels, and corresponds to the even sub-pixels of the second column of sub-pixels; two gate lines 14 are arranged between the first row of sub-pixels and the second row of sub-pixels, the gate line 14 close to the first row of sub-pixels corresponds to the first row of sub-pixels, and the gate line 14 close to the second row of sub-pixels corresponds to the second row of sub-pixels.

It should be noted that, the even sub-pixels of the first column of sub-pixels can be individually arranged with a corresponding data line 13, so as to display normally, or as shown in FIG. 15, the first column of sub-pixels or more columns of sub-pixels can be located in the non-display region, so that even the even sub-pixels of the first column of sub-pixels cannot display, it may not influence the normal display of the display region. Those skilled in the art can select either of the above two manners according to actual need, which will not be limited herein.

As shown in FIG. 15, in Manner One, there exists only a situation that two gate lines 14 or no gate line 14 are arranged between adjacent two rows of sub-pixels. When two gate lines 14 are arranged between adjacent two rows of sub-pixels, the width of the corresponding black matrix is larger than the width of the black matrix when one gate line 14 is arranged therebetween, when no gate line 14 is arranged between adjacent two rows of sub-pixels, the width of the corresponding black matrix is smaller than the width of the black matrix when one gate line 14 is arranged therebetween, and the width difference between the black matrix corresponding to the situation of two gate lines 14 being provided and the black matrix corresponding to the situation of one gate line 14 being provided is smaller than the width difference between the black matrix corresponding to the situation of one gate lines 14 being provided and the black matrix corresponding to the situation of no gate line 14 being provided, which makes the total area of the black matrix on the second substrate 2 in Manner One is smaller, so that the area occupied by the black matrix for light shading in the display region of the display panel is smaller, thus the transmittance of the display panel is higher.

Similarly, in the arrangement manner in FIG. 8, the second row and the third row (or the fourth row and the fifth row etc.) of sub-pixels of the repeat unit 10 are identical in the direction indicated by the arrow. Therefore, it is also possible that one data line 13 is arranged between the first column of sub-pixels and the second column of sub-pixels, the data line 13 corresponds to the odd sub-pixels of the first column of sub-pixels, and corresponds to the even sub-pixels of the second column of sub-pixels; one data line 13 is arranged between the second column of sub-pixels and the third column of sub-pixels, the data line 13 corresponds to the odd sub-pixels of the second column of sub-pixels, and corresponds to the even sub-pixels of the third column of sub-pixels, and so on; two gate lines 14 are arranged between the second row of sub-pixels and the third row of sub-pixels, the gate line 14 close to the second row of sub-pixels corresponds to the second row of sub-pixels, and the gate line 14 close to the third row of sub-pixels corresponds to the third row of sub-pixels; two gate lines 14 are arranged between the fourth row of sub-pixels and the fifth row of sub-pixels, the gate line 14 close to the fourth row of sub-pixels corresponds to the fourth row of sub-pixels, and the gate line 14 close to the fifth row of sub-pixels corresponds to the fifth row of sub-pixels, and so on.

It should be noted that, the even sub-pixels of the first column of sub-pixels can be individually arranged with a corresponding data line 13, the first row of sub-pixels can be individually arranged with a corresponding gate line 14, so that the even sub-pixels of the first column of sub-pixels and the first row of sub-pixels can display normally. Or, it is also possible that, the first column of sub-pixels or more columns of sub-pixels can be located in the non-display region, and the first row of sub-pixels or more rows of sub-pixels can be located in the non-display region, so that even the even sub-pixels of the first column of sub-pixels and the first row of the sub-pixels cannot display, it may not influence the normal display of the display region. Those skilled in the art can select either of the above two manners according to actual need, which will not be limited herein. The beneficial effect of such an arrangement manner is the same as Manner One, which will not be repeated herein.

Figure 16:
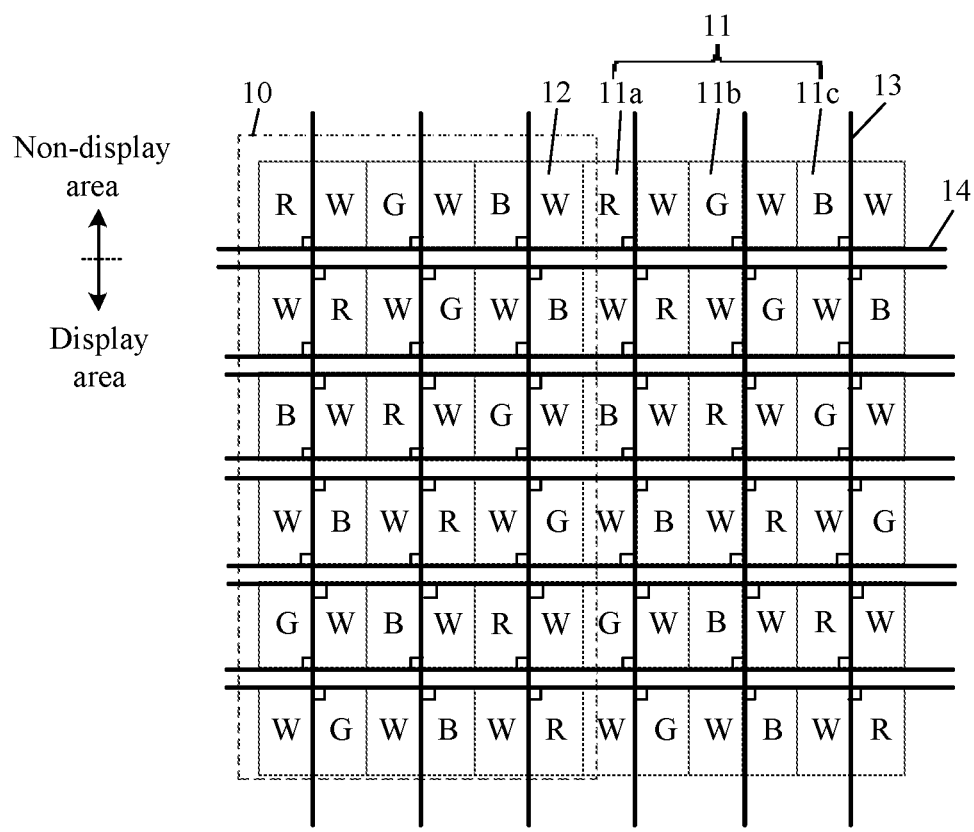
FIG. 16 illustrates a second top view of a first substrate corresponding to FIG. 8 according to an embodiment of the present disclosure.

Manner Two, as shown in FIG. 16, FIG. 16 illustrates a second top view of a first substrate corresponding to FIG. 8 according to an embodiment of the present disclosure. A data line 13 is arranged between the first column of sub-pixels and the second column of sub-pixels, the data line 13 corresponds to both the first column of sub-pixels and the second sub-pixels; a data line 13 is arranged between the third column of sub-pixels and the fourth column of sub-pixels, the data line 13 corresponds to both the third column of sub-pixels and the fourth column of sub-pixels, and so on; two gate lines 14 are arranged between the first row of sub-pixels and the second row of sub-pixels, the gate line 14 close to the first row of sub-pixels corresponds to the odd sub-pixels of the first row of sub-pixels, the gate line 14 close to the second row of sub-pixels corresponds to the even sub-pixels of the second row of sub-pixels; two gate lines 14 are arranged between the second row of sub-pixels and the third row of sub-pixels, the gate line 14 close to the second row of sub-pixels corresponds to the odd sub-pixels of the second row of sub-pixels, the gate line 14 close to the third row of sub-pixels corresponds to the even sub-pixels of the third row of sub-pixels, and so on.

It should be noted that, the even sub-pixels of the first row of sub-pixels can be individually arranged with a corresponding gate line 14, so as to display normally, or as shown in FIG. 16, the first row of sub-pixels or more rows of sub-pixels can be located in the non-display region, so that even the even sub-pixels of the first row of sub-pixels cannot display, it may not influence the normal display of the display region. Those skilled in the art can select either of the two manners according to actual need, which will not be limited herein.

As shown in FIG. 16, in Manner Two, adjacent two columns of sub-pixels share one data line 13, so as to effectively reduce the number of the data line 13; two gate lines 14 are arranged between adjacent two rows of sub-pixels, and each row of sub-pixels is controlled respectively by the two gate lines 14, one gate line 14 controls the odd sub-pixels, the other gate line 14 controls the even sub-pixels, so that the control of the gate line 14 to the sub-pixels is more accurate, thus the display effect is better.

Absolutely, while a data line 13 is shared by adjacent two columns of sub-pixels, each row of sub-pixels can be individually arranged with one gate line 14 to control an entire row of sub-pixels. Such a design makes it possible that the area of the black matrix corresponding to the gate line 14 is not changed, while the number of the data line 13 is effectively reduced so as to significantly reduce the area of the black matrix corresponding to the data line 13, so that the total area of the black matrix on the second substrate 2 is smaller, and the area occupied by the black matrix light shading in the display region of the display panel is smaller, thus the transmittance of the display panel is higher.

Similarly, in the arrangement manner shown in FIG. 8, the second column and the third column (or the fourth column and the fifth column etc.) of sub-pixels of the repeat unit 10 are identical in the direction indicated by the arrow. Therefore, a data line 13 can be arranged between the second column of sub-pixels and the third column of sub-pixels, the data line 13 corresponds to both the second column of sub-pixels and the third column of sub-pixels; a data line 13 is arranged between the fourth column of sub-pixels and the fifth column of sub-pixels, the data line 13 corresponds to both the fourth column of sub-pixels and the fifth column of sub-pixels, and so on; two gate lines 14 are arranged between the first row of sub-pixels and the second row of sub-pixels, the gate line 14 close to the first row of sub-pixels corresponds to the odd sub-pixels of the first row of sub-pixels, the gate line 14 close to the second row of sub-pixels corresponds to the even sub-pixels of the second row of sub-pixels; two gate lines 14 are arranged between the second row of sub-pixels and the third row of sub-pixels, the gate line 14 close to the second row of sub-pixels corresponds to the odd sub-pixels of the second row of sub-pixels, the gate line 14 close to the third row of sub-pixels corresponds to the even sub-pixels of the third row of sub-pixels, and so on. It should be noted that, in such an arrangement manner, the even sub-pixels of the first row of sub-pixels can be individually arranged with a corresponding gate line 14, the first column of the sub-pixel can be individually arranged with a corresponding gate line 14, so that the even sub-pixels of the first row of sub-pixels and the first column of sub-pixels both can display normally, and the first row of sub-pixels or more rows of sub-pixels can be located in the non-display region. Or, the first column of sub-pixels or more columns of sub-pixels can be located in the non-display region, and then even the even sub-pixels of the first row of sub-pixels and the first column of sub-pixels cannot display, it may not influence the normal display of the display region. Those skilled in the art can select either of the two manners according to actual need, which will not be limited herein. The beneficial effect and variations of such an arrangement manner are the same as Manner One, which will not be repeated herein.

Figure 17:
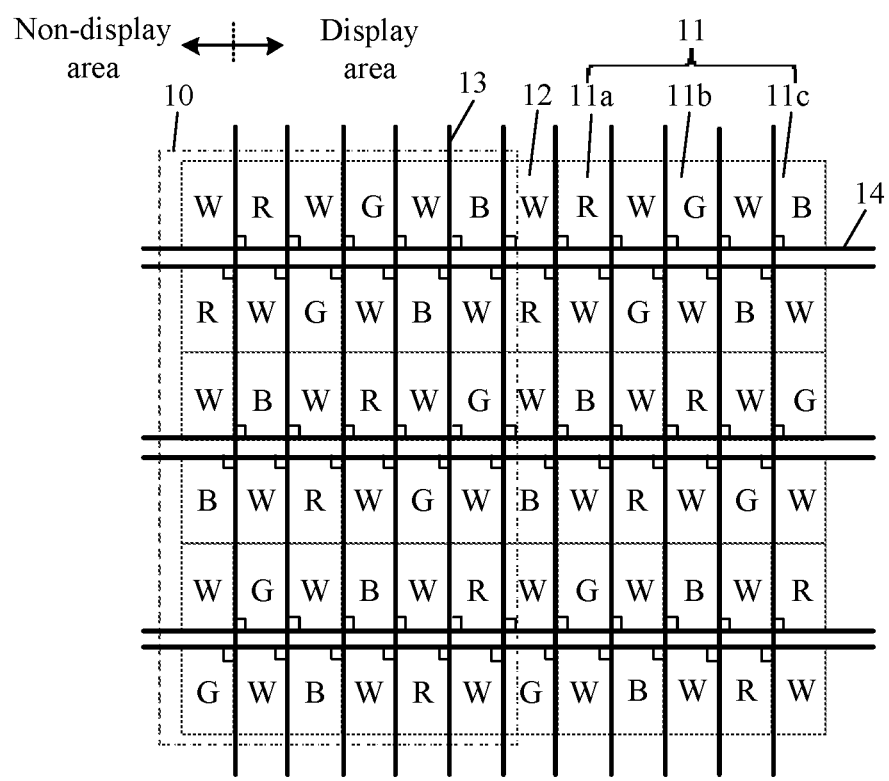
FIG. 17 illustrates a first top view of a first substrate corresponding to FIG. 9 according to an embodiment of the present disclosure.

It can be seen from FIG. 9 that, in the arrangement manner shown in FIG. 9, the first row and the second row (or the third row and the fourth row etc.) of sub-pixels of the repeat unit 10 are identical in the direction indicated by the arrow, and the first column and the second column (or the third column and the fourth column etc.) of sub-pixels are identical in the direction indicated by the arrow. Based on this, the embodiment of the present disclosure provides two arrangement manners of the data lines and the gate lines on the first substrate 1:

Manner one, as shown in FIG. 17, FIG. 17 illustrates a first top view of a first substrate corresponding to FIG. 9 according to an embodiment of the present disclosure. A data line 13 is arranged between the $x_4^{th}$ column of sub-pixels and the $(x_4+1)^{th}$ column of sub-pixels, the data line 13 corresponds to the even sub-pixels of the $x_4^{th}$ column of sub-pixels, and corresponds to the odd sub-pixels of the $(x_4+1)^{th}$ column of sub-pixels, $x_4$ is an integer greater than or equal to 1; two gate lines 14 are arranged between the $(2y_4+1)^{th}$ row of sub-pixels and the $(2(y_4+1))^{th}$ row of sub-pixels, the gate line 14 close to the $(2y_4+1)^{th}$ row of sub-pixels corresponds to the $(2y_4+1)^{th}$ row of sub-pixels, the gate line 14 close to the $(2(y_4+1))^{th}$ row of sub-pixels corresponds to the $(2(y_4+1))^{th}$ row of sub-pixels, $y_4$ is an integer greater than or equal to 0.

For example, as shown in FIG. 17, a data line 13 is arranged between the first column of sub-pixels and the second column of sub-pixels, the data line 13 corresponds to the even sub-pixels of the first column of sub-pixels, and corresponds to the odd sub-pixels of the second column of sub-pixels; two gate lines 14 are arranged between the first row of sub-pixels and the second row of sub-pixels, the gate line 14 close to the first row of sub-pixels corresponds to the first row of sub-pixels, the gate line 14 close to the second row of sub-pixels corresponds to the second row of sub-pixels.

It should be noted that, the odd sub-pixels of the first column of sub-pixels can be individually arranged with a corresponding data line 13, so as to display normally, or as shown in FIG. 17, the first column of sub-pixels or more columns of sub-pixels can be located in the non-display region, so that even the odd sub-pixels of the first column of sub-pixels cannot display, it may not influence the normal display of the display region. Those skilled in the art can select either of the two manners according to actual need, which will not be limited herein.

As shown in FIG. 17, in arrangement manner one, there exists only a situation that two gate lines 14 or no gate line 14 are arranged between adjacent two rows of sub-pixels. When two gate lines 14 are arranged between adjacent two rows of sub-pixels, the width of the corresponding black matrix is larger than the width of the black matrix when one gate line 14 is arranged therebetween, when no gate line 14 is arranged between adjacent two rows of sub-pixels, the width of the corresponding black matrix is smaller than the width of the black matrix when one gate line 14 is arranged therebetween, and the width difference between the black matrix corresponding to the situation of two gate lines 14 being provided and the black matrix corresponding to the situation of one gate line 14 being provided is smaller than the width difference between the black matrix corresponding to the situation of one gate lines 14 being provided and the black matrix corresponding to the situation of no gate line 14 being provided, so that the total area of the black matrix on the second substrate 2 in the present arrangement manner is smaller, and then the area occupied by the black matrix for light shading in the display region of the display panel is smaller, thus the transmittance of the display panel is higher.

Figure 18:
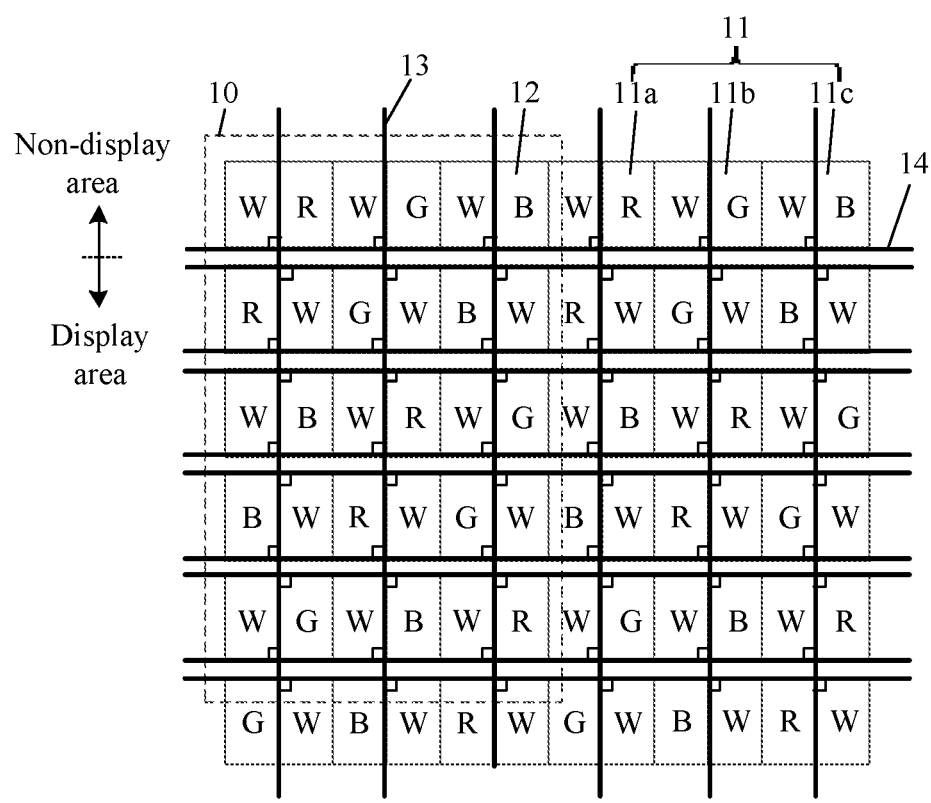
FIG. 18 illustrates a second top view of a first substrate corresponding to FIG. 9 according to an embodiment of the present disclosure.

Manner Two, as shown in FIG. 18, FIG. 18 illustrates a second top view of a first substrate corresponding to FIG. 9 according to an embodiment of the present disclosure. A data line 13 is arranged between the first column of sub-pixels and the second column of sub-pixels, the data line 13 corresponds to both the first column of sub-pixels and the second column of sub-pixels; a data line 13 is arranged between the third column of sub-pixels and the fourth column of sub-pixels, the data line 13 corresponds to both the third column of sub-pixels and the fourth column of sub-pixels, and so on; two gate lines 14 are arranged between the first row of sub-pixels and the second row of sub-pixels, the gate line 14 close to the first row of sub-pixels corresponds to the odd sub-pixels of the first row of sub-pixels, the gate line 14 close to the second row of sub-pixels corresponds to the even sub-pixels of the second row of sub-pixels; two gate lines 14 are arranged between the second row of sub-pixels and the third row of sub-pixels, the gate line 14 close to the second row of sub-pixels corresponds to the odd sub-pixels of the second row of sub-pixels, the gate line 14 close to the third row of sub-pixels corresponds to the even sub-pixels of the third row of sub-pixels, and so on.

It should be noted that, the even sub-pixels of the first row of sub-pixels can be individually arranged with a corresponding gate line 14, so as to display normally, or as shown in FIG. 18, the first row of sub-pixels or more rows of sub-pixels can be located in the non-display region, so that even the even sub-pixels of the first row of sub-pixels cannot display, it may not influence the normal display of the display region. Those skilled in the art can select either of the two manners according to actual need, which will not be limited herein.

As shown in FIG. 18, in Manner Two, adjacent two columns of sub-pixels share one data line 13, so as to effectively reduce the number of the data line 13; two gate lines 14 are arranged between adjacent two rows of sub-pixels, and each row of sub-pixels is respectively controlled by the two gate lines 14, one gate line 14 controls the odd sub-pixels, the other gate line 14 controls the even sub-pixels, so that the control of the gate line 14 to the sub-pixels is more accurate, thus the display effect is better.

Absolutely, while a data line 13 is shared by adjacent two columns of sub-pixels, each row of sub-pixels can be individually arranged with one gate line 14 to control an entire row of sub-pixels. Such a design makes it possible that the area of the black matrix corresponding to the gate line 14 is not changed, while the number of the data line 13 is effectively reduced so as to significantly reduce the area of the black matrix corresponding to the data line 13, so that the total area of the black matrix on the second substrate 2 is smaller, and the area occupied by the black matrix for light shading in the display region of the display panel is smaller, thus the transmittance of the display panel is higher.

Figure 19:
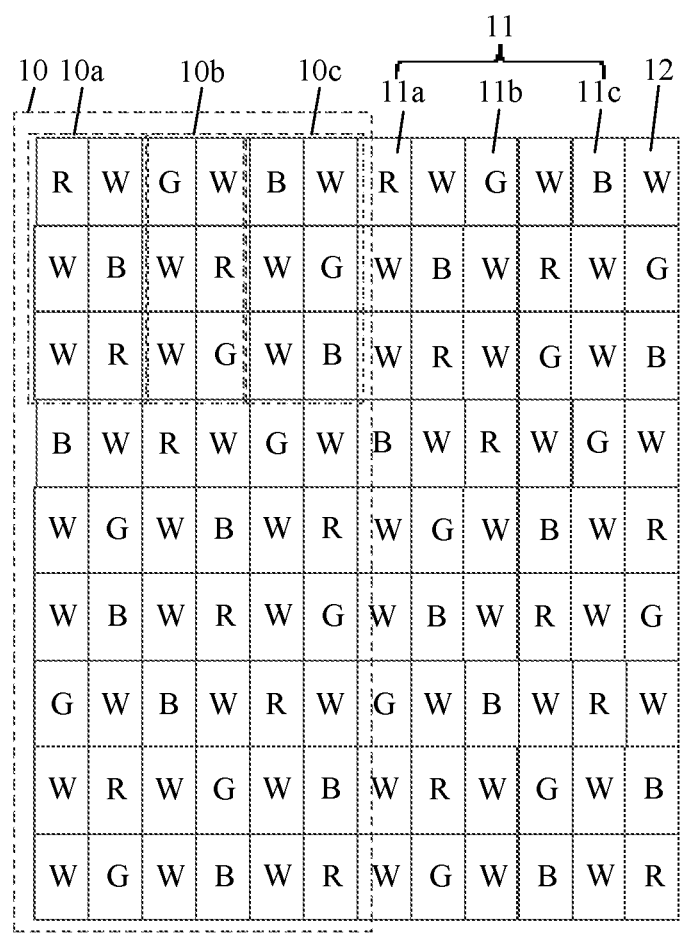
FIG. 19 illustrates an eighth schematic diagram of an arrangement of sub-pixels according to an embodiment of the present disclosure.

For example, as shown in FIG. 19, FIG. 19 is an eighth schematic diagram of an arrangement manner of the sub-pixel according to the embodiments of the present disclosure. Each of the first sub-unit 10a, the second sub-unit 10b and the third sub-unit 10c includes sub-pixels arranged in a 3*2 array, each sub-unit includes three color sub-pixels 11 and three highlight sub-pixels 12.

Optionally, as shown in FIG. 19, the first sub-unit 10a includes two first color sub-pixels 11a, one third color sub-pixel 11c and three highlight sub-pixels 12, and the first row of the first sub-unit 10a is successively arranged with the first color sub-pixel 11a and the highlight sub-pixel 12, the second row is successively arranged with the highlight sub-pixel 12 and the third color sub-pixel 11c, the third row is successively arranged with the highlight sub-pixel 12 and the first color sub-pixel 11a; the second sub-unit 10b includes two second color sub-pixels 11b, one first color sub-pixel 11a and three highlight sub-pixels 12, and the first row of the second sub-unit 10b is successively arranged with the second color sub-pixel 11b and the highlight sub-pixel 12, the second row is successively arranged with the highlight sub-pixel 12 and the first color sub-pixel 11a, the third row is successively arranged with the highlight sub-pixel 12 and the second color sub-pixel 11b; the third sub-unit 10c includes two third color sub-pixels 11c, one second color sub-pixel 11b and two highlight sub-pixels 12, and the first row of the third sub-unit 10c is successively arranged with the third color sub-pixel 11c and the highlight sub-pixel 12, the second row is successively arranged with the highlight sub-pixel 12 and the second color sub-pixel 11b, the third row is successively arranged the highlight sub-pixel 12 and the third color sub-pixel 11c.

Figure 20:
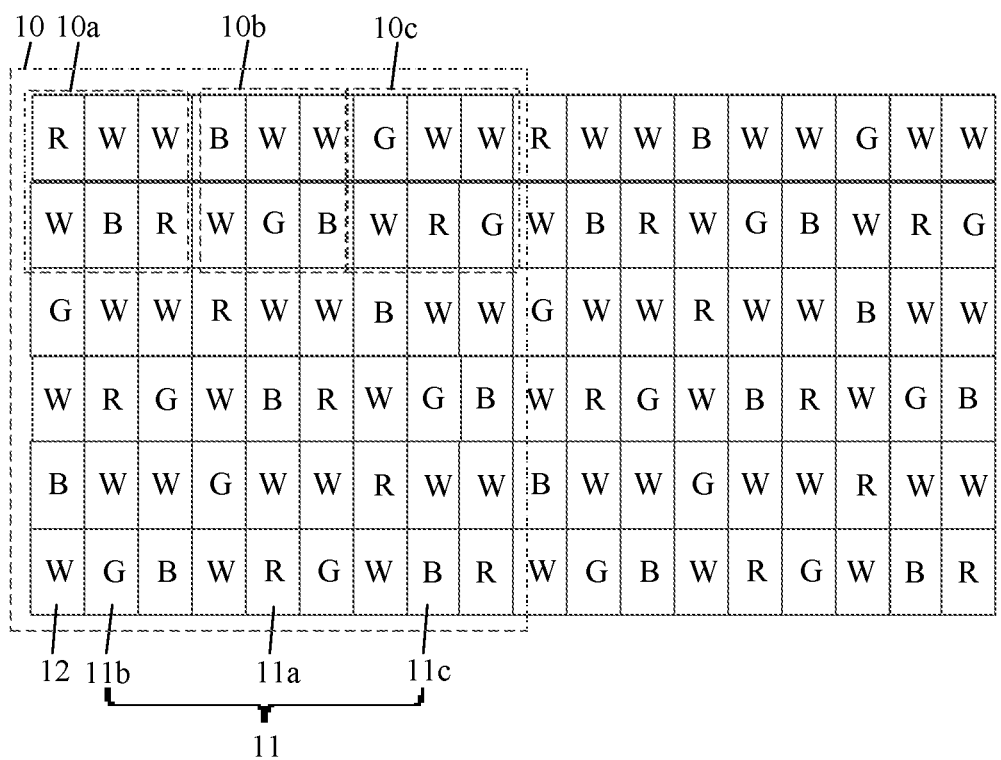
FIG. 20 illustrates a ninth schematic diagram of an arrangement of sub-pixels according to an embodiment of the present disclosure.

For example, as shown in FIG. 20, FIG. 20 is a ninth schematic diagram of arrangement manner of the sub-pixels according to an embodiment of the present disclosure. Each of the first sub-unit 10a, the second sub-unit 10b and the third sub-unit 10c includes sub-pixels arranged in a 2*3 array, each sub-unit includes three color sub-pixels 11 and three highlight sub-pixels 12.

Optionally, as shown in FIG. 20, the first sub-unit 10a includes two first color sub-pixels 11a, one third color sub-pixel 11c and three highlight sub-pixels 12, and the first row of the first sub-unit 10a is successively arranged with the first color sub-pixel 11a, the highlight sub-pixel 12 and the highlight sub-pixel 12, the second row is successively arranged with the highlight sub-pixel 12, and the third color sub-pixel 11c and the first color sub-pixel 11a; the second sub-unit 10b includes two third color sub-pixels 11c, one second color sub-pixel 11b and three highlight sub-pixels 12, and the first row of the second sub-unit 10b is successively arranged with the third color sub-pixel 11c, the highlight sub-pixel 12 and the highlight sub-pixel 12, the second row is successively arranged with the highlight sub-pixel 12, the second color sub-pixel 11b and the third color sub-pixel 11c; the third sub-unit 10c includes two second color sub-pixels 11b, one first color sub-pixel 11a and three highlight sub-pixels 12, and the first row of the third sub-unit 10c is successively arranged with the second color sub-pixel 11b, the highlight sub-pixel 12 and the highlight sub-pixel 12, the second row is successively arranged with the highlight sub-pixel 12, the first color sub-pixel 11a and the second color sub-pixel 11b.

Figure 21:
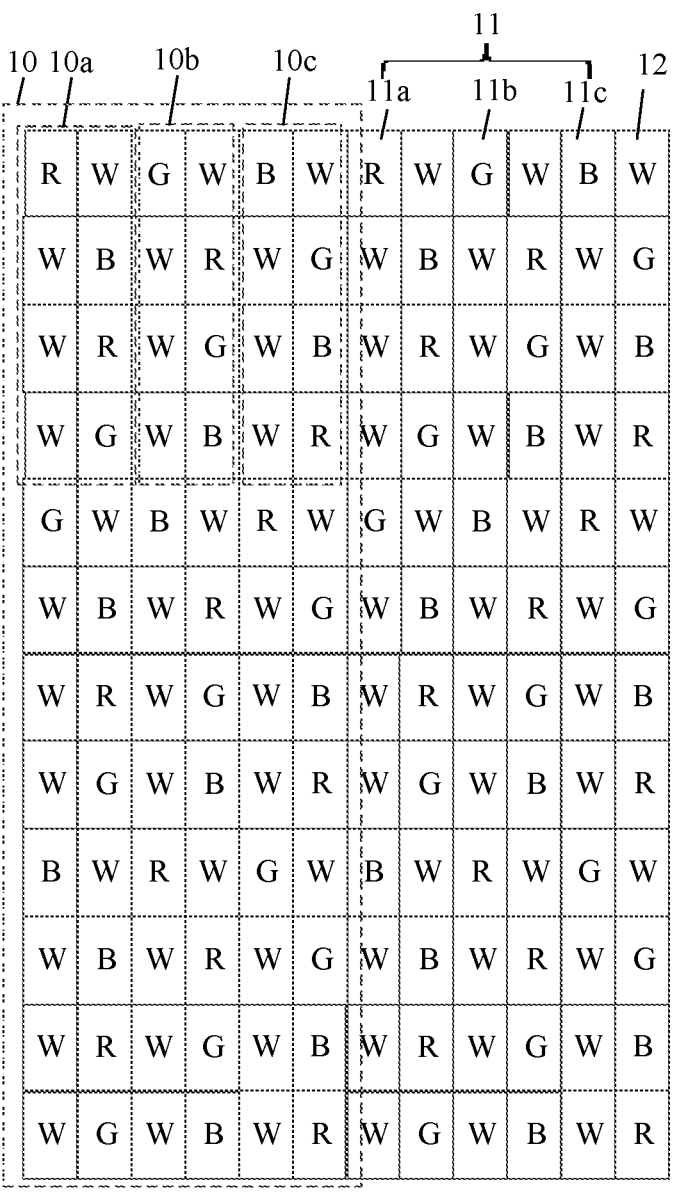
FIG. 21 illustrates a tenth schematic diagram of an arrangement of sub-pixels according to an embodiment of the present disclosure.

For example, as shown in FIG. 21, each of the first sub-unit 10a, the second sub-unit 10b and the third sub-unit 10c includes sub-pixels arranged in a 4*2 array, each sub-unit includes four color sub-pixels 11 and four highlight sub-pixels 12.

Optionally, as shown in FIG. 21, FIG. 21 illustrates a tenth schematic diagram of an arrangement of sub-pixels according to an embodiment of the present disclosure. The first sub-unit 10a includes two first color sub-pixels 11a, one second color sub-pixel 11b, one third color sub-pixel 11c and four highlight sub-pixels 12, and the first row of the first sub-unit 10a is successively arranged with the first color sub-pixel 11a and the highlight sub-pixel 12, the second row is successively arranged with the highlight sub-pixel 12 and the third color sub-pixel 11c, the third row is successively arranged with the highlight sub-pixel 12 and the first color sub-pixel 11a, the fourth row is successively arranged with the highlight sub-pixel 12 and the second color sub-pixel 11b; the second sub-unit 10b includes two second color sub-pixels 11b, one first color sub-pixel 11a, one third color sub-pixel 11c and four highlight sub-pixels 12, and the first row of the second sub-unit 10b is successively arranged with the second color sub-pixel 11b and the highlight sub-pixel 12, the second row is successively arranged with the highlight sub-pixel 12 and the first color sub-pixel 11a, the third row is successively arranged with the highlight sub-pixel 12 and the second color sub-pixel 11b, the fourth row is successively arranged with the highlight sub-pixel 12 and the third color sub-pixel 11c; the third sub-unit 10c includes two third color sub-pixels 11c, one first color sub-pixel 11a, one second color sub-pixel 11b and four highlight sub-pixels 12, and the first row of the third sub-unit 10c is successively arranged with the third color sub-pixel 11c and the highlight sub-pixel 12, the second row is successively arranged with the highlight sub-pixel 12 and the second color sub-pixel 11b, the third row is successively arranged the highlight sub-pixel 12 and the third color sub-pixel 11c, the fourth row is successively arranged with the highlight sub-pixel 12 and the first color sub-pixel 11a.

Besides, optionally, the first color sub-pixel 11a, the second color sub-pixel 11b and the third color sub-pixel 11c are respectively one of the red sub-pixel, the green sub-pixel and the blue sub-pixel. For example, in FIG. 3, the first color sub-pixel 11a is a red sub-pixel (indicated by R in FIG. 3), the second color sub-pixel 11b is a green sub-pixel (indicated by G in FIG. 3), and the third color sub-pixel 11c is a blue sub-pixel (indicated by B in FIG. 3).

Optionally, the highlight sub-pixel 12 is a white sub-pixel or a yellow sub-pixel. Optionally, in FIG. 3, the highlight sub-pixel 12 is a white sub-pixel (indicated by W in FIG. 3).

Optionally, the width-length ratio of each of the first color sub-pixel 11a, the second color sub-pixel 11b and the third color sub-pixel 11c and the highlight sub-pixel 12 is 0.5:1.

Figure 22:
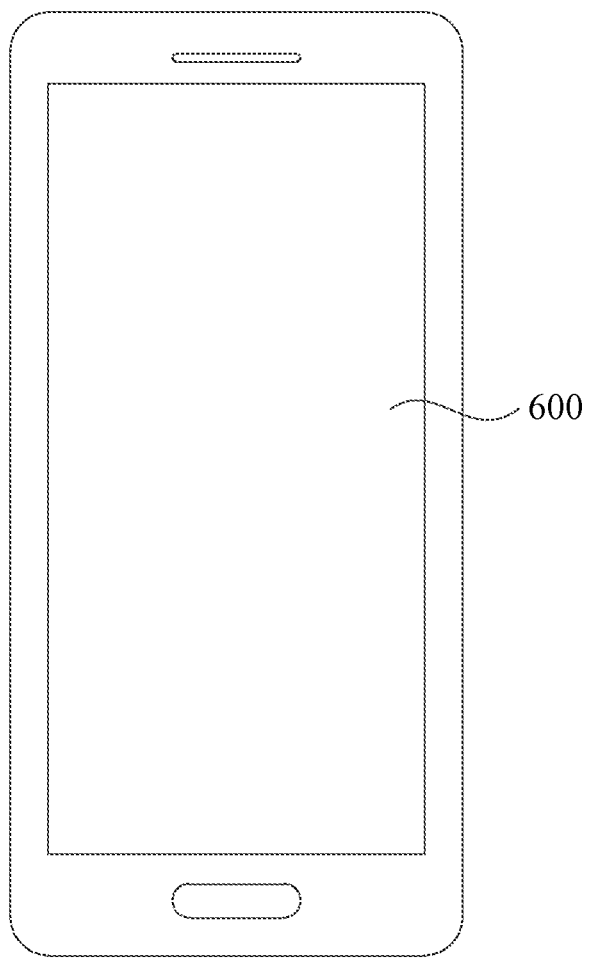
FIG. 22 illustrates a top view of a liquid crystal display device according to an embodiment of the present disclosure.

In addition, the embodiment of the present disclosure provides a liquid crystal display device, as shown in FIG. 22, FIG. 22 illustrates a top view of a liquid crystal display panel according to an embodiment of the present disclosure. The liquid crystal display device includes the liquid crystal display panel 600 in any of the above-mentioned embodiments. The display device provided by the present disclosure can be products or components having display function such as smart phone, wearable smart watch, smart glasses, tablet PC, television, display screen, laptop, digital photo frame, navigator, car monitor, e-book etc. The display panel and the display device provided by the embodiment of the present disclosure can be flexible, also can be non-flexible, which will not be limited in the present disclosure.

The embodiments of the present disclosure provides a liquid crystal display panel and a liquid crystal display device, the first substrate of the liquid crystal display panel is provided with a plurality of sub-pixels, the sub-pixels are divided into a plurality of repeat units arranged in an array, each repeat unit includes a plurality of sub-units arranged in an array. In each repeat unit, a first sub-unit 10a, a second sub-unit 10b and a third sub-unit 10c are arranged in a row direction and a column direction, each of the first sub-unit 10a, the second sub-unit 10b and the third sub-unit 10c includes at least two color sub-pixels and at least two highlight sub-pixels 12. The total number of the first color sub-pixel 11a in the first sub-unit 10a, the second sub-unit 10b and the third sub-unit 10c, the total number of the second color sub-pixel 11b in the first sub-unit 10a, the second sub-unit 10b and the third sub-unit 10c, and the total number of the third color sub-pixel 11c in the first sub-unit 10a, the second sub-unit 10b and the third sub-unit 10c are identical to each other, so that the liquid crystal display panel can achieve a full-color display, and the number of the color sub-pixel in each sub-unit is equal to the total number of the highlight sub-pixel 12 in each sub-unit, so that the area of the highlight sub-pixel in each sub-unit occupies 50%, which is far higher than 25% in the prior art, therefore, the area ratio of the highlight sub-pixels 12 to all the sub-pixels can be significantly improved, so as to improve transmittance of the display panel.

The above are just the preferred embodiments of the present disclosure, which will not limit the present disclosure. Any modifications, equivalent replacements and improvements made within the spirits and principles of the present disclosure shall all fall in the protection scope of the present disclosure.

What is claimed is:

1. A liquid crystal display panel, comprising:
   a first substrate;
   a second substrate placed opposite to the first substrate; and
   a liquid crystal layer arranged between the first substrate and the second substrate;
   wherein the first substrate comprises a plurality of sub-pixels, the plurality of sub-pixels is divided into a plurality of repeat units arranged in an array, each of the plurality of repeat units comprises a plurality of sub-units arranged in an array; in each of the plurality of repeat units, a first sub-unit, a second sub-unit and a third sub-unit are arranged in both a row direction and a column direction,
   wherein each of the first sub-unit, the second sub-unit and the third sub-unit comprises at least two color sub-pixels and at least two highlight sub-pixels, each of the color sub-pixels is a first color sub-pixel, a second color sub-pixel or a third color sub-pixel; in each of the first sub-unit, the second sub-unit and the third sub-unit, a total number of the color sub-pixel is equal to a total number of the highlight sub-pixel; a total number of the first color sub-pixel in the first sub-unit, the second sub-unit and the third sub-unit, a total number of the second color sub-pixel in the first sub-unit, the second sub-unit and the third sub-unit and a total number of the third color sub-pixel in the first sub-unit, the second sub-unit and the third sub-unit are identical to each other,
   wherein in each row of the sub-pixels of each repeat unit, the number of the first color sub-pixel, the number of the second color sub-pixel and the number of the third color sub-pixel are identical to each other, and a total number of the color sub-pixel is equal to a total number of the highlight sub-pixel; in each column of the sub-pixels of each repeat unit, the number of the first color sub-pixel, the number of the second color sub-pixel and the number of the third color sub-pixel are identical to each other, and a total number of the color sub-pixel is equal to a total number of the highlight sub-pixel, each of the first sub-unit, the second sub-unit and the third sub-unit comprises 4 sub-pixels arranged in a 2*2 array, the 4 sub-pixels comprising two color sub-pixels and two highlight sub-pixels, the first sub-unit comprises two first color sub-pixels and two highlight sub-pixels, the second sub-unit comprises two second color sub-pixels and two highlight sub-pixels, the third sub-unit comprises two third color sub-pixels and two highlight sub-pixels, and wherein the highlight sub-pixel is a white sub-pixel or a yellow sub-pixel.

2. The liquid crystal display panel according to claim 1, wherein each of the repeat units comprises 9 sub-units arranged in a 3*3 array, the 9 sub-units comprising three first sub-units, three second sub-units and three third sub-units.

3. The liquid crystal display panel according to claim 1, wherein in each of the first sub-unit, the second sub-unit and the third sub-unit, a first row is successively arranged with one corresponding color sub-pixel and one highlight sub-pixel, and a second row is successively arranged with one highlight sub-pixel and one corresponding color sub-pixel.

4. The liquid crystal display panel according to claim 3, wherein one data line is arranged between an $x_3^{th}$ column of the sub-pixels and an $(x_3+1)^{th}$ column of the sub-pixels, the data line corresponds to odd sub-pixels of the $x_3^{th}$ column of the sub-pixels, and corresponds to even sub-pixels of the $(x_3+1)^{th}$ column of the sub-pixels, wherein $x_3$ is an integer greater than or equal to 1; two gate lines are arranged between a $(2y_3+1)^{th}$ row of the sub-pixels and a $(2(y_3+1))^{th}$ row of the sub-pixels, one of the two gate lines close to the $(2y_3+1)^{th}$ row of the sub-pixels corresponds to the $(2y_3+1)^{th}$ row of the sub-pixels, and the other one of the two gate lines close to the $(2(y_3+1))^{th}$ row of the sub-pixels corresponds to the $(2(y_3+1))^{th}$ row of the sub-pixels, wherein y3 is an integer greater than or equal to 0.

5. The liquid crystal display panel according to claim 1, wherein in each of the first sub-unit, the second sub-unit and the third sub-unit, a first row is successively arranged with one highlight sub-pixel and one corresponding color sub-pixel, and a second row is successively arranged with one corresponding color sub-pixel and one highlight sub-pixel.

6. The liquid crystal display panel according to claim 5, wherein one data line is arranged between an $x_4^{th}$ column of the sub-pixels and an $(x_4+1)^{th}$ column of the sub-pixels, and the data line corresponds to even sub-pixels of the $x_4^{th}$ column of the sub-pixels, and corresponds to odd sub-pixels of the $(x_4+1)^{th}$ column of the sub-pixels, wherein $x_4$ is an integer greater than or equal to 1; two gate lines are arranged between a $(2y_4+1)^{th}$ row of the sub-pixels and a $(2(y_4+1))^{th}$ row of the sub-pixels, one of the two gate lines close to the $(2y_4+1)^{th}$ row of the sub-pixels corresponds to the $(2y_4+1)^{th}$ row of the sub-pixels, and the other one of the two gate lines close to the $(2(y_4+1))^{th}$ row of the sub-pixels corresponds to the $(2(y_4+1))^{th}$ row of the sub-pixels, wherein $y_4$ is an integer greater than or equal to 0.

7. The liquid crystal display panel according to claim 1, wherein each of the first color sub-pixel, the second color sub-pixel and the third color sub-pixel is respectively one of a red sub-pixel, a green sub-pixel and a blue sub-pixel.

8. The liquid crystal display panel according to claim 1, wherein a width-length ratio of each of the first color sub-pixel, the second color sub-pixel and the third color sub-pixel and the highlight sub-pixel is 0.5:1.

9. A liquid crystal display device, comprising a liquid crystal display panel, wherein the liquid crystal display panel comprises:

a first substrate;

a second substrate placed opposite to the first substrate; and a liquid crystal layer arranged between the first substrate and the second substrate;

wherein the first substrate comprises a plurality of sub-pixels, the plurality of sub-pixels is divided into a plurality of repeat units arranged in an array, each of the plurality of repeat units comprises a plurality of sub-units arranged in an array; in each of the plurality of repeat units, a first sub-unit, a second sub-unit and a third sub-unit are arranged in both a row direction and a column direction, wherein each of the first sub-unit, the second sub-unit and the third sub-unit comprises at least two color sub-pixels and at least two highlight sub-pixels, each of the color sub-pixels is a first color sub-pixel, a second color sub-pixel or a third color sub-pixel; in each of the first sub-unit, the second sub-unit and the third sub-unit, a total number of the color sub-pixel is equal to a total number of the highlight sub-pixel; a total number of the first color sub-pixel in the first sub-unit, the second sub-unit and the third sub-unit, a total number of the second color sub-pixel in the first sub-unit, the second sub-unit and the third sub-unit and a total number of the third color sub-pixel in the first sub-unit, the second sub-unit and the third sub-unit are identical to each other, wherein in each row of the sub-pixels of each repeat unit, the number of the first color sub-pixel, the number of the second color sub-pixel and the number of the third color sub-pixel are identical to each other, and a total number of the color sub-pixel is equal to a total number of the highlight sub-pixel; in each column of the sub-pixels of each repeat unit, the number of the first color sub-pixel, the number of the second color sub-pixel and the number of the third color sub-pixel are identical to each other, and a total number of the color sub-pixel is equal to a total number of the highlight sub-pixel, each of the first sub-unit, the second sub-unit and the third sub-unit comprises 4 sub-pixels arranged in a 2*2 array, the 4 sub-pixels comprising two color sub-pixels and two highlight sub-pixels, the first sub-unit comprises two first color sub-pixels and two highlight sub-pixels, the second sub-unit comprises two second color sub-pixels and two highlight sub-pixels, the third sub-unit comprises two third color sub-pixels and two highlight sub-pixels, and wherein the highlight sub-pixel is a white sub-pixel or a yellow sub-pixel.

* * * * *